(12) United States Patent
Maruyama

(10) Patent No.: US 11,148,053 B2
(45) Date of Patent: Oct. 19, 2021

(54) GAME SYSTEM, GAME CONTROL DEVICE, AND INFORMATION STORAGE MEDIUM

(71) Applicant: KONAMI DIGITAL ENTERTAINMENT CO., LTD., Tokyo (JP)

(72) Inventor: Daisuke Maruyama, Tokyo (JP)

(73) Assignee: KONAMI DIGITAL ENTERTAINMENT CO., LTD., Tokyo (JP)

(*) Notice: Subject to any disclaimer, the term of this patent is extended or adjusted under 35 U.S.C. 154(b) by 0 days.

(21) Appl. No.: 16/860,034

(22) Filed: Apr. 27, 2020

(65) Prior Publication Data

US 2020/0254344 A1 Aug. 13, 2020

Related U.S. Application Data

(63) Continuation of application No. PCT/JP2018/040598, filed on Oct. 31, 2018.

(30) Foreign Application Priority Data

Oct. 31, 2017 (JP) .............................. JP2017-210905

(51) Int. Cl.
*A63F 13/537* (2014.01)
*A63F 13/95* (2014.01)

(52) U.S. Cl.
CPC ............ *A63F 13/537* (2014.09); *A63F 13/95* (2014.09)

(58) Field of Classification Search
CPC ........ A63F 13/79; A63F 13/537; A63F 13/55; A63F 13/95
See application file for complete search history.

(56) References Cited

U.S. PATENT DOCUMENTS

2002/0160835 A1* 10/2002 Fujioka ................. A63F 13/822
463/31
2004/0143852 A1* 7/2004 Meyers ................... A63F 13/12
725/133

(Continued)

FOREIGN PATENT DOCUMENTS

JP 2005204948 A 8/2005
JP 2012196424 A 10/2012
(Continued)

OTHER PUBLICATIONS

The Written Opinion of The International Searching Authority (PCT/ISA/237) for relating PCT/JP2018/040598 p. 1-10.
(Continued)

*Primary Examiner* — Steve Rowland
(74) *Attorney, Agent, or Firm* — HEA Law PLLC

(57) ABSTRACT

A game system comprising: at least one processor configured to: acquire a first parameter corresponding to a user object, the first parameter indicating an ability of the user object; acquire a second parameter corresponding to the user object, the second parameter being different from the first parameter; acquire a third parameter corresponding to an opponent object, the third parameter indicating an ability of the opponent object; acquire a fourth parameter corresponding to the user object, the fourth parameter being different from the first parameter; compare the second parameter and the fourth parameter; and execute a control for having an advantage on a game in which the user object competes with the opponent object based on the first parameter, the third parameter and a comparison result.

6 Claims, 17 Drawing Sheets

(56) References Cited

U.S. PATENT DOCUMENTS

| | | | |
|---|---|---|---|
| 2005/0143174 A1* | 6/2005 | Goldman | A63F 13/87 463/42 |
| 2007/0167239 A1* | 7/2007 | O'Rourke | G07F 17/32 463/42 |
| 2007/0265091 A1* | 11/2007 | Aguilar, Jr. | G07F 17/3227 463/42 |
| 2007/0298886 A1* | 12/2007 | Aguilar, Jr. | G07F 17/32 463/42 |
| 2008/0096665 A1* | 4/2008 | Cohen | A63F 13/12 463/42 |
| 2008/0287196 A1* | 11/2008 | Miki | A63F 13/60 463/42 |
| 2009/0227373 A1* | 9/2009 | Yamamoto | A63F 13/53 463/38 |
| 2011/0212758 A1* | 9/2011 | Kane | A63F 13/12 463/9 |
| 2011/0237335 A1* | 9/2011 | Holloway | A63F 13/822 463/42 |
| 2012/0004036 A1* | 1/2012 | Hill | A63F 3/08 463/42 |
| 2012/0046093 A1* | 2/2012 | Yamaguchi | A63F 13/65 463/23 |
| 2012/0142429 A1* | 6/2012 | Muller | A63F 13/35 463/42 |
| 2012/0190456 A1* | 7/2012 | Rogers | G06Q 10/00 463/42 |
| 2013/0316835 A1* | 11/2013 | Takagi | A63F 13/35 463/42 |
| 2014/0274414 A1* | 9/2014 | Annunziata | A63F 13/56 463/42 |
| 2014/0309002 A1* | 10/2014 | O'Gorman | G07F 17/3267 463/7 |

FOREIGN PATENT DOCUMENTS

| | | |
|---|---|---|
| JP | 2014124295 A | 7/2014 |
| JP | 2015036035 A | 2/2015 |
| JP | 2015154987 A | 8/2015 |
| JP | 2016030188 A | 3/2016 |
| JP | 2016043255 A | 4/2016 |
| JP | 2017077350 A | 4/2017 |

OTHER PUBLICATIONS

Office Action dated Dec. 10, 2019, for relating JP application No. 2019-169946 with English translation p. 1-7.
Pawapuro Apuri, List of the score bonus (main / sub) of springbaseball, Pawapuro Apuri Koryaku Urawaza Matome, Dec. 20, 2015, p. 1-12 [Online] [search on Nov. 28, 2019], URL, Pawapuro Apuri Koryaku. com/springbaseball-scorebounus.html (See computer generated English translation of the Office Action dated Dec. 10, 2019 for relating JP application No. 2019-169946).
[Pawapuro] Basic Knowledge! Basic Knowledge of the pitcher fielder, Pawapuro Apuri Koryaku Wiki, Feb. 2, 2015, p. 1-4 [Online] [Search on Nov. 28, 2019], URL,https://gamy.jp/pawapuro/[ パワプロ ] Basic Knowledge! Basic Knowledge of the player (See computer generated English translation of the Office Action dated Dec. 10, 2019 for relating JP application No. 2019-169946).
2015 years of opening!, PlayStation.Blog, Mar. 24, 2015, p. 1-16 [Online] [search on Nov. 28, 2019], URL,https://www.jp.playstation. com/blog/detail/303/20150324_prospi2015.html (See computer generated English translation of the Office Action dated Dec. 10, 2019 for relationg JP application No. 2019-169946).
Notice of January joint birthday festival, [Narukore] NARUTO Collection wind disturbance koryaku Wiki, Jan. 26, 2016, p. 1-4 [Online] [search on Nov. 28, 2019], URL,naruto.upwiki.net/archives/ 24981.html (See computer generated English translation of the Office Action dated Dec. 10, 2019 for relationg JP application No. 2019-169946).
Ranking events, [Narukore] NARUTO Collection wind disturbance koryaku Wiki, Mar. 15, 2016, p. 1-4 [Online] [Search on Nov. 27, 2019], URL,naruto.upwiki.net/archives/30818.html (See computer generated English translation of the Office Action dated Dec. 10, 2019 for relationg JP application No. 2019-169946).
Office Action dated Dec. 10, 2019, for relating JP application No. 2019-169947 with English translation p. 1-6.
Aruka / unacceptable approval, HUNTER×HUNTER Koryaku wiki, Oct. 15, 2014, p. 1-2 [Online] [Search on Nov. 27, 2019], URL, hxh.rakuwiki.com/card/1353/ (See computer generated English translation of the Office Action dated Dec. 10, 2019 for relating JP application No. 2019-169947).
Machi / Halloween 2014ver, HUNTER×HUNTER Koryaku wiki, Jan. 2, 2015, p. 1-2 [Online] [Search on Nov. 27, 2019], URL, hxh.rakuwiki.com/card/1350/(See computer generated English translation of the Office Action dated Dec. 10, 2019 for relating JP application No. 2019-169947).
Office Action dated Aug. 18, 2020, for corresponding JP Patent Application No. 2019-006217 with English translation.
Office Action dated Jan. 19, 2021, for corresponding JP Patent Application No. 2019-006217 with English translation pp. 1-5.
[Prospin A] V. Challenge! 6. In comparison with V. 5 and various comparisons [ProYakyu Spirits A] #144, [Youtube] [online], Apr. 21, 2016; URL: https://www.youtube.com/watch?v-qyTilRqE1nY (See attached screen shots. Searched on Dec. 25, 2020) pp. 1-5. (See Computer generated English translation of the Office Action).
Office Action dated Jun. 15, 2021, for corresponding JP Patent Application No. 2019-006217 with English translation pp. 1-5.
Screen captures from YouTube video clip entitle "[Prospin a] 2017 Series 1 Opening! Final S pulling out", 16 pages, uploaded on Mar. 29, 2017 by user "Ryusei Moria". Retrieved from Internet: <https:// www.youtube.com/watch?v=MN-Q5Hu4s1k>. Searched on May 26, 2021. (See Computer generated English translation of the Office Action).
Screen captures from YouTube video clip entitle "[Prospin A] 2017 Series 2 Opening! I got 10 draft scouts in a row and my team S came. It's a miracle that Tsutsugo came down! Pro Yakyu Spirits A] #76", 10 pages, uploaded on Sep. 4, 2017 by user "Chiri GAMES". Retrieved from Internet: <https://www.youtube.com/watch?v= hNFqR08LOdM>. Searched on May 26, 2021. (See Computer generated English translation of the Office Action).
International Search Report for PCT/JP2018/040598 with English translation.
Office Action dated Jun. 12, 2018, for corresponding JP application No. 2017-210905 with English translation.
Office Action dated Oct. 23, 2018, for corresponding JP application No. 2017-210905 with English translation.
Office Action dated Dec. 12, 2019, for corresponding TW application No. 107138902 (See English abstract of cited document JP2015-154987A by JPO).
Office Action dated May 14, 2019, for relating JP application No. 2017-210904 with English translation.
The battle format "Standards" and "wild", Hearthstone Express [online], Mar. 15, 2017, Mar. 26, 2019 search, URL, http://hs-exp. jp/2017-03-15/format-standard-wild/ (See Computer generated English translation of the Office Action dated May 14, 2019, for relating JP Application No. 2017-210904).
The battle format "Standards" and "wild" Part 2 , Hearthstone Express [online], Mar. 15, 2017 , Mar. 26, 2019 search, URL, http://hs-exp.jp/2017-03-15/format-standard-wild/2/ (See Computer generated English translation of the Office Action dated May 14, 2019, for relating JP Application No. 2017-210904).
The battle format "Standards" and "wild" Part 3 , Hearthstone Express [online] , Mar. 15, 2017 , Mar. 26, 2019 search, URL, http://hs-exp.jp/2017-03-15/format-standard-wlld/3/ (See Computer generated English translation of the Office Action dated May 14, 2019, for relating JP Application No. 2017-210904).
Office Action dated Sep. 12, 2017, for relating JP application No. 2016-130697 with English translation.
Pawapuro Apuri Koryaku Wiki Battle Stadium 5 (Batosuta 5) no Koryaku to Talsaku, [online], Nov. 2, 2015, Search date: Aug. 29, 2017, URL, https:// パワプロ .gamewith.jp/article/show/18125 (See

(56) References Cited

OTHER PUBLICATIONS

Computer generated English translation of the Office Action dated Sep. 12, 2017, for relating JP application No. 2016-130697).
Office Action dated Jan. 30, 2018, for relating JP application No. 2016-130697 with English translation.
[Grimmsnotes Strategies] Introduction of a Recommendation * 4hero [online] Jan. 23, 2016, Jan. 19, 2018 Search URL, https://game.boom-app.com/entry/grimmsnotes-play-06 (See Computer generated English translation of the Office Action dated Jan. 30, 2018, for relating JP application No. 2016-130697).
[Grimmsnotes Strategy] Convenience for increasing the material drop rate of material, such as increasing the material drop rate, [online] Mar. 16, 2016, Jan. 19, 2018 search URL, https://dengekionline.com/elem/000/001/236/1236271/ (See Computer generated English translation of the Office Action dated Jan. 30, 2018, for Yelating JP application No. 2016-130697).
International Search Report for relating International application No. PCT/JP2017/022324 with English translation.
The Written Opinion of The International Searching Authority (PCT/ISA/237) for relating PCT/JP2017/022324.
Office Action dated Aug. 13, 2019, for relating KR application No. 10-2018-7034299 with English translation.
Office Action dated Sep. 12, 2017, for relating JP application No. 2016-130698 with English translation.
Dragon Quest Monsters Super Light (DQMSL) Koryaku Wiki, [online], Nov. 26, 2015, search date: Aug. 29, 2017, URL, https://gamy.jp/dqmsl/dqmsl-tougijou-bussitu (See Computer generated English translation of the Office Action dated Sep. 12, 2017, for relating JP application No. 2016-130698).
International Search Report for relaiting PCT/JP2017/022325 with English translation.
The Written Opinion of The International Searching Authority (PCT/ISA/237) for relating PCT/JP2017/022325.
Office Action dated Aug. 8, 2019, for relating KR application No. 10-2018-7034296 with English translation.

* cited by examiner

FIG.9

| SERIES | RANK | Lv1 | LvMAX | SPECIAL TRAINING Lv10 | SUPER 1 | SUPER 2 | SUPER 3 | SUPER 4 | SUPER 5 |
|---|---|---|---|---|---|---|---|---|---|
| 2016-1 | S | 1000 | 1700 | 1750 | 1800 | 1850 | 1900 | 1950 | 2000 |
| | A | 900 | 1600 | 1650 | 1700 | 1750 | 1800 | 1850 | 1900 |
| | B | 800 | 1500 | 1550 | 1600 | 1650 | 1700 | 1750 | 1800 |
| | C | 700 | 1400 | 1450 | 1500 | 1550 | 1600 | 1650 | 1700 |
| | D | 600 | 1300 | 1350 | 1400 | 1450 | 1500 | 1550 | 1600 |
| 2016-2 | S | 1200 | 1900 | 1950 | 2000 | 2050 | 2100 | 2150 | 2200 |
| | A | 1100 | 1800 | 1850 | 1900 | 1950 | 2000 | 2050 | 2100 |
| | B | 1000 | 1700 | 1750 | 1800 | 1850 | 1900 | 1950 | 2000 |
| | C | 900 | 1600 | 1650 | 1700 | 1750 | 1800 | 1850 | 1900 |
| | D | 800 | 1500 | 1550 | 1600 | 1650 | 1700 | 1750 | 1800 |
| 2017-1 | S | 1400 | 2100 | 2150 | 2200 | 2250 | 2300 | 2350 | 2400 |
| | A | 1300 | 2000 | 2050 | 2100 | 2150 | 2200 | 2250 | 2300 |
| | B | 1200 | 1900 | 1950 | 2000 | 2050 | 2100 | 2150 | 2200 |
| | C | 1100 | 1800 | 1850 | 1900 | 1950 | 2000 | 2050 | 2100 |
| | D | 1000 | 1700 | 1750 | 1800 | 1850 | 1900 | 1950 | 2000 |
| 2017-2 | S | 1600 | 2300 | 2350 | 2400 | 2450 | 2500 | 2550 | 2600 |
| | A | 1500 | 2200 | 2250 | 2300 | 2350 | 2400 | 2450 | 2500 |
| | B | 1400 | 2100 | 2150 | 2200 | 2250 | 2300 | 2350 | 2400 |
| | C | 1300 | 2000 | 2050 | 2100 | 2150 | 2200 | 2250 | 2300 |
| | D | 1200 | 1900 | 1950 | 2000 | 2050 | 2100 | 2150 | 2200 |

FIG.11

| USER ID | USER NAME | GAME POINTS | GAME ITEMS | UPPER LIMIT COST |
|---|---|---|---|---|
| U1 | USER U1 | ----- | ----- | 250 |
| U2 | USER U2 | ----- | ----- | 250 |
| U3 | USER U3 | ----- | ----- | 280 |
| ... | ... | ... | ... | ... |

USER ID:U2
USER ID:U1

| SERIAL NUMBER | PLAYER CHARACTER ID | NAME | SERIES | RANK | COST | POSITION | ... | EXPERIENCE VALUE | LEVEL | UPPER LIMIT LEVEL | SPECIAL TRAINING LEVEL | ABILITY PARAMETERS | SPIRIT PARAMETER |
|---|---|---|---|---|---|---|---|---|---|---|---|---|---|
| 1 | C162008 | PLAYER H | 2016-2 | A | 13 | OUT FIELDER | ... | 70 | 1 | 60 | 0 | — | 1100 |
| 2 | C171006 | PLAYER F | 2017-1 | S | 15 | SHORTSTOP | ... | 70 | 1 | 70 | 0 | — | 1400 |
| 3 | C171024 | PLAYER X | 2017-1 | B | 11 | FIRST BASEMAN | ... | 70 | 1 | 50 | 0 | — | 1200 |
| 4 | C172001 | PLAYER A | 2017-2 | B | 11 | THIRD BASEMAN | ... | 0 | 1 | 50 | 0 | — | 1400 |
| ... | ... | ... | ... | ... | ... | ... | ... | ... | ... | ... | ... | ... | ... |

USER ID: U2

USER ID: U1

| | | SERIAL NUMBER | BATTING ORDER |
|---|---|---|---|
| PITCHERS | STARTING 1 | 5 | |
| | STARTING 2 | 10 | |
| | STARTING 3 | 17 | |
| | STARTING 4 | 21 | |
| | STARTING 5 | 22 | |
| | MIDDLE RELIEF 1 | 6 | |
| | MIDDLE RELIEF 2 | 16 | |
| | MIDDLE RELIEF 3 | 23 | |
| | MIDDLE RELIEF 4 | 24 | |
| | CLOSER | 7 | |
| FIELDERS | CATCHER | 8 | 9 |
| | FIRST BASEMAN | 3 | 7 |
| | SECOND BASEMAN | 18 | 5 |
| | THIRD BASEMAN | 11 | 4 |
| | SHORTSTOP | 2 | 1 |
| | LEFT FIELDER | 1 | 2 |
| | CENTER FIELDER | 12 | 8 |
| | RIGHT FIELDER | 14 | 6 |
| | DH | 9 | 3 |
| | BENCH 1 | 4 | |
| | BENCH 2 | 13 | |
| | BENCH 3 | 19 | |
| | BENCH 4 | 20 | |

| TEAM SPIRIT VALUE | 18000 |
|---|---|

D1041, D1042, D104

GAME SYSTEM, GAME CONTROL DEVICE, AND INFORMATION STORAGE MEDIUM

CROSS-REFERENCE TO RELATED APPLICATION

This application is a continuation application of International Application PCT/JP2018/040598 filed on Oct. 31, 2018, which claims priority from Japanese application JP 2017-210905 filed on Oct. 31, 2017, the content of these applications are incorporated herein by reference in their entirety.

BACKGROUND OF THE INVENTION

1. Field of the Invention

The present invention relates to a game system, a game control device, and an information storage medium.

2. Description of the Related Art

Games executed based on one or a plurality of objects are known. For example, as a sports game (such as a baseball game, a soccer game, a basketball game, an ice hockey game, or an American football game), there are known games in which a user plays a match by using one or a plurality of player characters corresponding to real athletes (JP 2015-036035 A).

SUMMARY OF THE INVENTION

In such a game as that described above, there are cases in which it is desired to urge the user to acquire and use an object provided in a period other than a specific period rather than an object provided in the specific period. For example, there may be a case in which it is desired to urge the user to acquire and use an object provided after a specific point in time rather than an object provided before the specific point in time.

For example, in such a sports game as that described above, when the 2016 season of the sport in the real world ends, a player character group in which ability parameters are set based on the actual results achieved by each real athlete in the 2016 season is created and provided, and player characters are acquired and used by the user from among that player character group. Further, when the 2017 season ends, a player character group in which ability parameters are set based on the actual results achieved by each real athlete in the 2017 season is newly created and provided, and player characters are acquired and used by the user from among that player character group.

In this case, player characters corresponding to the same player are included in the player character group from the 2016 season (hereinafter referred to as "old player character group") and the player character group from the 2017 season (hereinafter referred to as "new player character group"). However, for a player whose actual results in the 2017 season are lower than those in the 2016 season, the ability parameters are set lower in the new player character group than those in the old player character group. Therefore, the user may not desire to acquire and use the player character from the new player character group, and may continue using the player character from the old player character group. For this reason, in such a sports game, it may be desired to urge the user to acquire and use the player character from the new player character group rather than from the old player character group.

As a method for urging the user to acquire and use a player character from the new player character group rather than from the old player character group, there may be employed a method in which the ability parameters of the player characters from the new player character group are set relatively higher than those of the player characters from the old player character group. However, in this case, the values of the ability parameters may deviate from the abilities of the real player, and as a result, reality of the game may be harmed.

The present invention has been made in view of the above-mentioned problem, and has an object to provide a game system, a game control device, and an information storage medium, which are capable of urging a user to acquire and use an object provided in a period other than a specific period rather than an object provided in the specific period.

In order to solve the above-mentioned problems, according to at least one aspect of the present invention, there is provided a game system comprising: at least one processor; and at least one memory device that stores a plurality of instructions, which when executed by the at least one processor, cause the at least one processor to: acquire a first parameter corresponding to a user object, the first parameter indicating an ability of the user object; acquire a second parameter corresponding to the user object, the second parameter being different from the first parameter; acquire a third parameter corresponding to an opponent object, the third parameter indicating an ability of the opponent object; acquire a fourth parameter corresponding to the user object, the fourth parameter being different from the first parameter; compare the second parameter and the fourth parameter; and execute a control for having an advantage on a game in which the user object competes with the opponent object based on the first parameter, the third parameter and a comparison result.

According to at least one aspect of the present invention, there is provided a game control device comprising: at least one processor; and at least one memory device that stores a plurality of instructions, which when executed by the at least one processor, cause the at least one processor to: acquire a first parameter corresponding to a user object, the first parameter indicating an ability of the user object; acquire a second parameter corresponding to the user object, the second parameter being different from the first parameter; acquire a third parameter corresponding to an opponent object, the third parameter indicating an ability of the opponent object; acquire a fourth parameter corresponding to the user object, the fourth parameter being different from the first parameter; compare the second parameter and the fourth parameter; and execute a control for having an advantage on a game in which the user object competes with the opponent object based on the first parameter, the third parameter and a comparison result.

BRIEF DESCRIPTION OF THE DRAWINGS

FIG. 9 is a table for showing an example of a spirit parameter.

FIG. 11 is a table for showing an example of user data.

FIG. 13 is a table for showing an example of possessed player character data.

FIG. 14 is a table for showing an example of team data.

DETAILED DESCRIPTION OF THE INVENTION

[1. Embodiment] An embodiment of the present invention is described with reference to the accompanying drawings.

Figure 1:
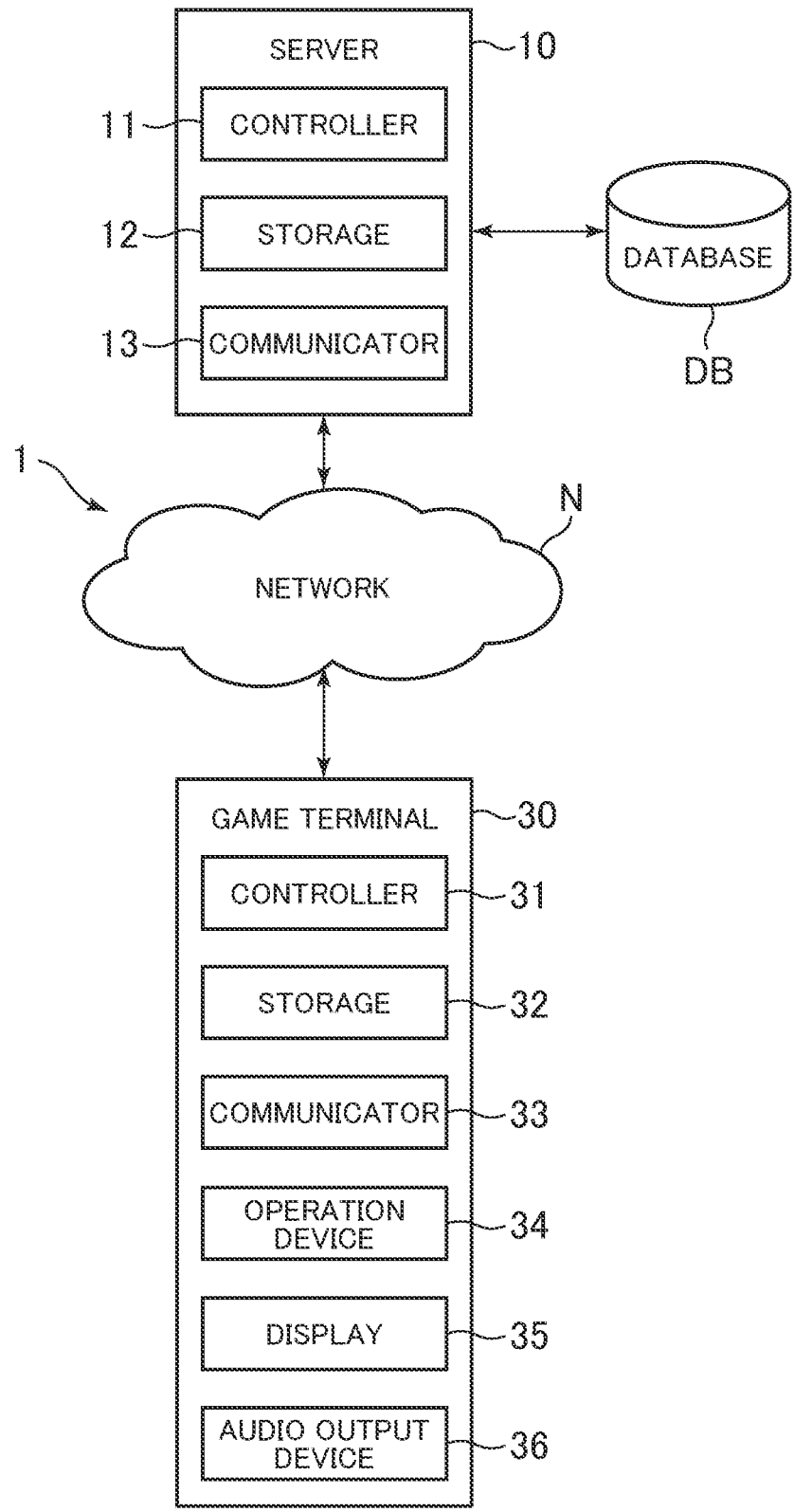
FIG. 1 is a diagram for illustrating an overall configuration of a game system according to at least one embodiment of the present invention.

[1-1. Configuration of Game System] FIG. 1 is a diagram for illustrating a configuration of a game system according to the embodiment of the present invention. As illustrated in FIG. 1, a game system 1 according to the embodiment includes a server 10 and a game terminal 30. The server 10 and the game terminal 30 are capable of communicating data to and from each other through a network N.

The server 10 is, for example, a server computer. As illustrated in FIG. 1, the server 10 includes a controller 11, a storage 12, and a communicator 13. The controller 11 includes at least one microprocessor (CPU), and executes information processing in accordance with a program stored in the storage 12. The storage 12 includes a main storage (for example, RAM) and an auxiliary storage (for example, nonvolatile semiconductor memory, hard disk drive, or solid-state drive), and stores the program or data. The communicator 13 communicates data to and from another device through the network N. The server 10 is capable of accessing a database DB. The database DB may be built in the server 10, or may be built in a server computer separate from the server 10.

The game terminal 30 is a computer to be used by a user to play a game. The game terminal 30 is, for example, a cell phone (including a smartphone), a portable information terminal (including a tablet computer), a desktop computer, a laptop computer, a consumer game machine (i.e., a video game console), a portable game machine, or a commercial game machine installed in an amusement facility or similar premises. In FIG. 1, there is illustrated only one game terminal 30, but the game system 1 may include a plurality of game terminals 30 to be used by a plurality of respective users.

As illustrated in FIG. 1, the game terminal 30 includes a controller 31, a storage 32, a communicator 33, an operation device 34, a display 35, and an audio output device 36. The controller 31, the storage 32, and the communicator 33 are the same as the controller 11, the storage 12, and the communicator 13, respectively, of the server 10. The operation device 34, the display 35, and the audio output device 36 may be installed in the game terminal 30 itself, or may be arranged as external devices connected to the terminal 30.

The operation device 34 is configured to allow the user to perform various operations. The display 35 is configured to display various images, and is, for example, a liquid crystal display or an organic EL display. In FIG. 1, the operation device 34 and the display 35 are arranged separately, but the operation device 34 and the display 35 may also be integrally formed as a touch panel. However, the operation device 34 and the display 35 are not required to be integrally formed as a touch panel, and the operation device 34 may be arranged separately from the display 35, such as a button (key), a lever (stick), a touch pad (track pad), or a mouse. The operation device 34 may also be configured to allow the user to perform an operation via speech or gestures. The audio output device 36 is configured to output audio data, and is, for example, a speaker or headphones.

A program and data are supplied to the server 10 or the game terminal 30 from a remote location through the network N to be stored in the storage 12 or the storage 32, respectively. The server 10 or the game terminal 30 may include a component (for example, optical disc drive or memory card slot) to be used for reading the program and the data stored in an information storage medium (for example, optical disc or memory card). Then, the program and the data may be supplied to the server 10 or the game terminal 30 through the information storage medium.

The following description is given based on the premise that the game terminal 30 is a smartphone or a tablet computer including a touch panel.

[1-2. Outline of Game] In the game system 1, it is possible to execute various games. For example, it is possible to execute various games regardless of its game format or genre, such as a sports game (game based on baseball, soccer, tennis, American football, basketball, volleyball, or the like), a racing game, a fighting game, a war game, a card game, a role-playing game, a simulation game, an adventure game, or a raising simulation game.

The game may be executed by the game terminal 30 performing data communication to and from the server 10 or another game terminal 30, or may be executed by the game terminal 30 alone.

For a baseball game, a game to be executed based on one or a plurality of objects (for example, a game character, a game card, or a game item) selected by a user is executed. In the following description, there is described a baseball game as an example of the game to be executed by the game system 1.

The user playing the baseball game can draw a lottery for a game character (hereinafter referred to as "player character") representing a baseball player by using a game item or game points. When a player character lottery is drawn, the player character selected based on lottery processing from a player character group prepared by the game system 1 is given to the user. The user collects the player characters given in this way, and forms his or her baseball team by using the collected player characters. The user then uses his or her baseball team to play a match against an opponent team.

In the game system 1, player characters imitating real baseball players are provided. That is, for each provided player character, the name of a real baseball player is set, and ability parameters are set based on the abilities and performance of that baseball player. The player character may also be a player character representing a fictitious baseball player.

Figure 2:
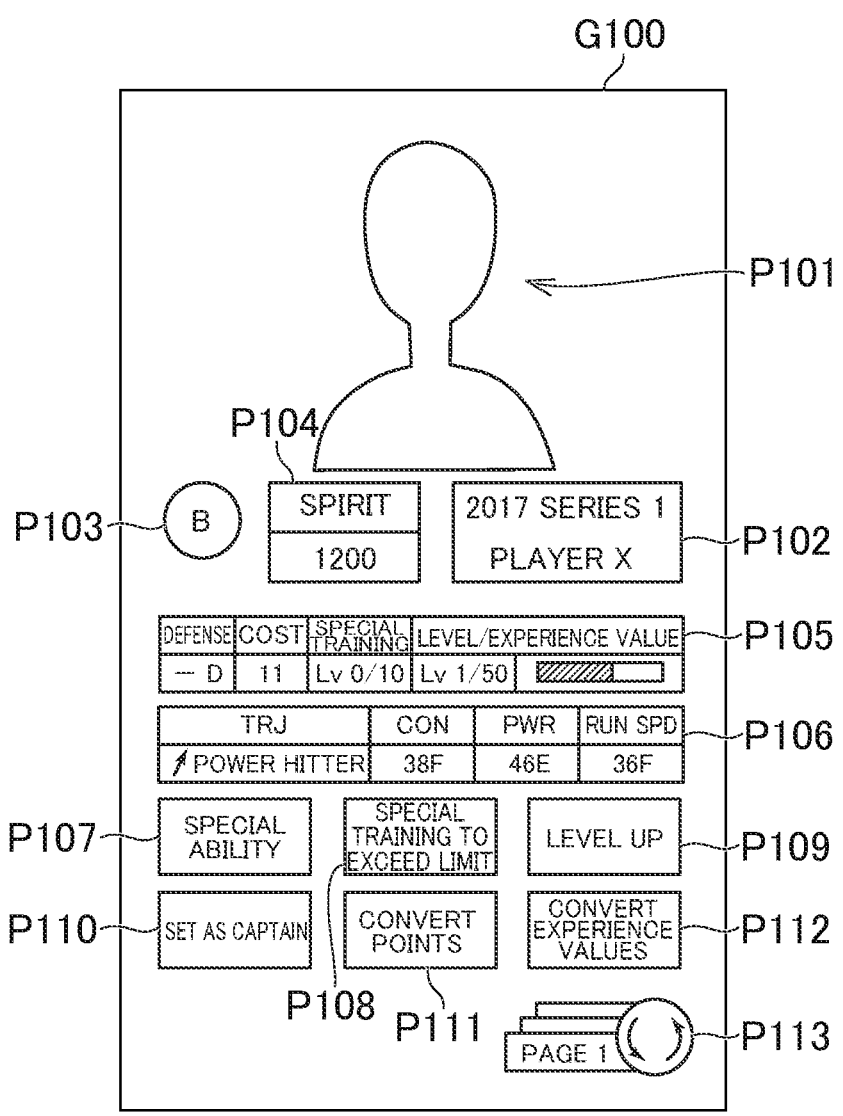
FIG. 2 is a diagram for illustrating an example of a player information image.

FIG. 2 is a diagram for illustrating an example of a player information image displayed on the display 35. As illustrated in FIG. 2, a player information image G100 shows information on the player character. The player information image G100 includes a plurality of pages, and the pages can be switched by designating a part P113. In the example illustrated in FIG. 2, a first page is displayed, and other information on the player character is displayed on the other pages.

The player information image G100 includes parts P101 and P102. The part P101 shows an image of the player character. The part P102 shows the name and series of the player character. In the example illustrated in FIG. 2, the name of the player character is "player X", but the name of a real baseball player is actually set as the name of the player character. Further, in the example illustrated in FIG. 2, the series of the player character is "2017 Series 1".

Figure 3:
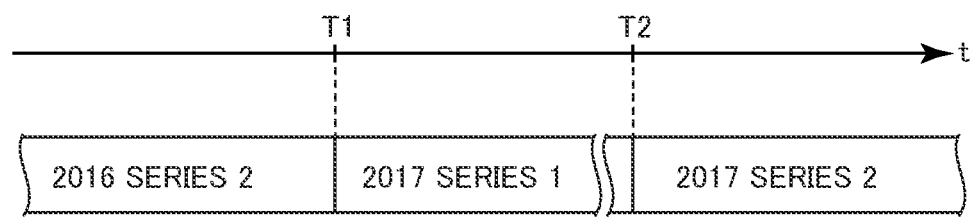
FIG. 3 is a timeline for showing an example of series for player characters.

FIG. 3 is a timeline for showing an example of series for player characters. In FIG. 3, the t-axis represents a time axis.

The timeline of FIG. 3 shows that during the period from a time T1 to a time T2, the player character group of "2017 Series 1" can be provided to the user (i.e., can be given to the user). That is, during the period from the time T1 to the time T2, when the user draws a player character lottery, a player character selected based on lottery processing from among the player character group of "2017 Series 1" is given to the user.

The player character group of "2017 Series 1" is a player character group created in accordance with the start of the 2017 season (baseball league starting in the spring of 2017 and ending in the fall of 2017) in the real world. For example, the player character group of "2017 Series 1" is released and becomes available to the user in the spring of 2017. The ability parameters of each player character included in the player character group of "2017 Series 1" are set based on the actual results of that player in the 2016 season (baseball league that started in the spring of 2016 and ended in the fall of 2016) and the pre-season games before the 2017 season. A newly created player character may also be added to the player character group of "2017 Series 1" in the period from the time T1 to the time T2.

The timeline of FIG. 3 shows that the player character group of "2017 Series 2" is released and becomes available to the user at the time T2. That is, after the time T2, when the user draws a player character lottery, a player character selected based on lottery processing from among the player character group of "2017 Series 2" is given to the user.

The player character group of "2017 Series 2" is a player character group created in accordance with the end of the 2017 season (baseball league starting in the spring of 2017 and ending in the fall of 2017) in the real world. For example, the player character group of "2017 Series 2" is released and becomes available to the user in the fall of 2017. The ability parameters of each player character included in the player character group of "2017 Series 2" are set based on the actual results of that player in the 2017 season. A newly created player character may also be added to the player character group of "2017 Series 2" from the time after the time T2.

When the player character group of "2017 Series 2" is released, the provision of the player character group of "2017 Series 1" is stopped. That is, at the time T2, the player characters to be given to the user change from the player character group of "2017 Series 1" to the player character group of "2017 Series 2". However, even after the time T2, the user can use "2017 Series 1" player characters acquired before the time T2.

The timeline of FIG. 3 shows that before the time T1, the player character group of "2016 Series 2" can be provided to the user. That is, before the time T1, when the user draws a player character lottery, a player character selected based on lottery processing from among the player character group of "2016 Series 2" is given to the user.

The player character group of "2016 Series 2" is a player character group created in accordance with the end of the 2016 season in the real world. For example, the player character group of "2016 Series 2" is a player character group released in the fall of 2016. The ability parameters of each player character included in the player character group of "2016 Series 2" are set based on the actual results of that player in the 2016 season. After the time T1, the provision of the player character group of "2016 Series 2" is stopped, but the user can use "2016 Series 2" player characters acquired before the time T1 even after the time T1. A player character group of "2016 Series 1" was being provided before the player character group of "2016 Series 2", but this is not shown in FIG. 3.

In the following description, each of "2016 Series 2", "2017 Series 1", and "2017 Series 2" are referred to as the "series" of the player character. Further, the following description is given based on the assumption that the current point in time is a time after the time point T2. That is, the description is given based on the assumption that "2017 Series 2" is the latest series, and "2016 Series 2" and "2017 Series 1" are old series.

Returning to FIG. 2, the player information image G100 includes parts P103 to P112. The part P103 indicates a rank of the player character. The rank indicates a rarity of the player character. As the rank becomes higher, the rarity becomes higher. Further, as the rarity becomes higher, the abilities of the player character become higher, and therefore, the rank indicates the abilities of the player character. The rank is indicated as one of five levels, for example, "S, A, B, C, and D". In this case, "S" is the highest rank, and "D" is the lowest rank. A plurality of types of player characters having different ranks may exist as player characters corresponding to the same real player. In addition, the rank may be referred to using another name, such as "grade" or "rarity".

The part P104 shows a spirit parameter of the player character. The spirit parameter is described later. The part P105 shows defense information, cost information, special training level information, and level/experience value information on the player character.

The defense information indicates an appropriate position (defense position) of the player character and a defensive skill of the player character. The defensive skill is indicated by, for example, one of eight levels of "S, A, B, C, D, E, F, and G". An "S" level indicates a very high defensive skill, and a "G" level indicates a very low defensive skill. An indication of "1D" indicates that the appropriate position of the player character is "first baseman", and the defensive skill of the player character is "D".

The cost information indicates the cost of the player character. The user is required to form the team such that the total cost of the player characters, who are the members of the team, does not exceed an upper limit (team cost).

The special training level information indicates a special training level of the player character. The special training level of the player character is increased by performing special training.

As the special training level increases, the ability parameters and the spirit parameter of the player character increase. An indication of "Lv 0/10" indicates that the upper limit of the special training level of the player character is "10" and the current special training level is "0".

The level/experience value information indicates a level and an experience value of the player character. Player characters who have appeared in a match are given an experience value. When the experience value reaches a predetermined value, the level of the player character is increased. When the level of the player character increases, the ability parameters and the spirit parameter of the player character increase. An indication of "Lv 1/50" indicates that the upper limit level of the player character is "50" and the current level is "1".

The part P106 shows a trajectory parameter, a contact parameter, a power parameter, and a running speed parameter of the player character. The trajectory parameter indicates how high a ball hit by the player character rises. The contact parameter indicates a contact skill of the player character (ability to hit a ball thrown by a pitcher with a bat). The power parameter indicates the power of the player character (ability to hit the ball thrown by the pitcher with the bat for a long distance). The running speed parameter indicates how fast the player character runs. In the example illustrated in FIG. 2, a numerical value and an alphabetic character are displayed for each of the contact parameter, the power parameter, and the running speed parameter. The numerical value indicates the value of the parameter, and the alphabetic character indicates the level of the ability. The ability level is indicated as one of eight levels of "S, A, B, C, D, E, F, and G". An indication of "S" indicates a very high ability, and an indication of "G" indicates a very low ability.

The part P107 is a part for displaying an image showing a list of special abilities of the player character. Examples of special abilities acquirable by a player character include a special ability of being good at taking opportunities (ability increases when there is an opportunity) and a special ability of being strong against left-handed pitchers (ability increases when the opponent is a left-handed pitcher).

The part P108 is a part for performing special training of the player character. For example, a player character can undergo special training by using up another player character. Through using up a player character having the same name and the same or higher rank, the upper limit level of the player character can be increased. The upper limit level can be raised to a level higher than the original upper limit level by five levels.

The part P112 is a part for converting a player character into an experience value. When the part P112 is selected, the experience value is stocked in exchange for excluding the player character from the player characters possessed by the user. The stocked experience value can be used to level up another player character. The part P109 is apart for leveling up a player character by using up the stocked experience value.

The part P110 is a part for setting a player character as captain. The part P111 is a part for converting a player character into game points (in-game currency). When the part P111 is selected, game points are given to the user in exchange for excluding the player character from the player characters possessed by the user.

In FIG. 2, there is illustrated a player character who is a fielder, but when the player character is a pitcher, pitcher role information (for example, starter, middle relief, and closer) is displayed in place of defense information. Further, pitcher ability parameters (for example, a top speed parameter, a ball control parameter, and a stamina parameter) are displayed in place of fielder ability parameters.

Figure 4:
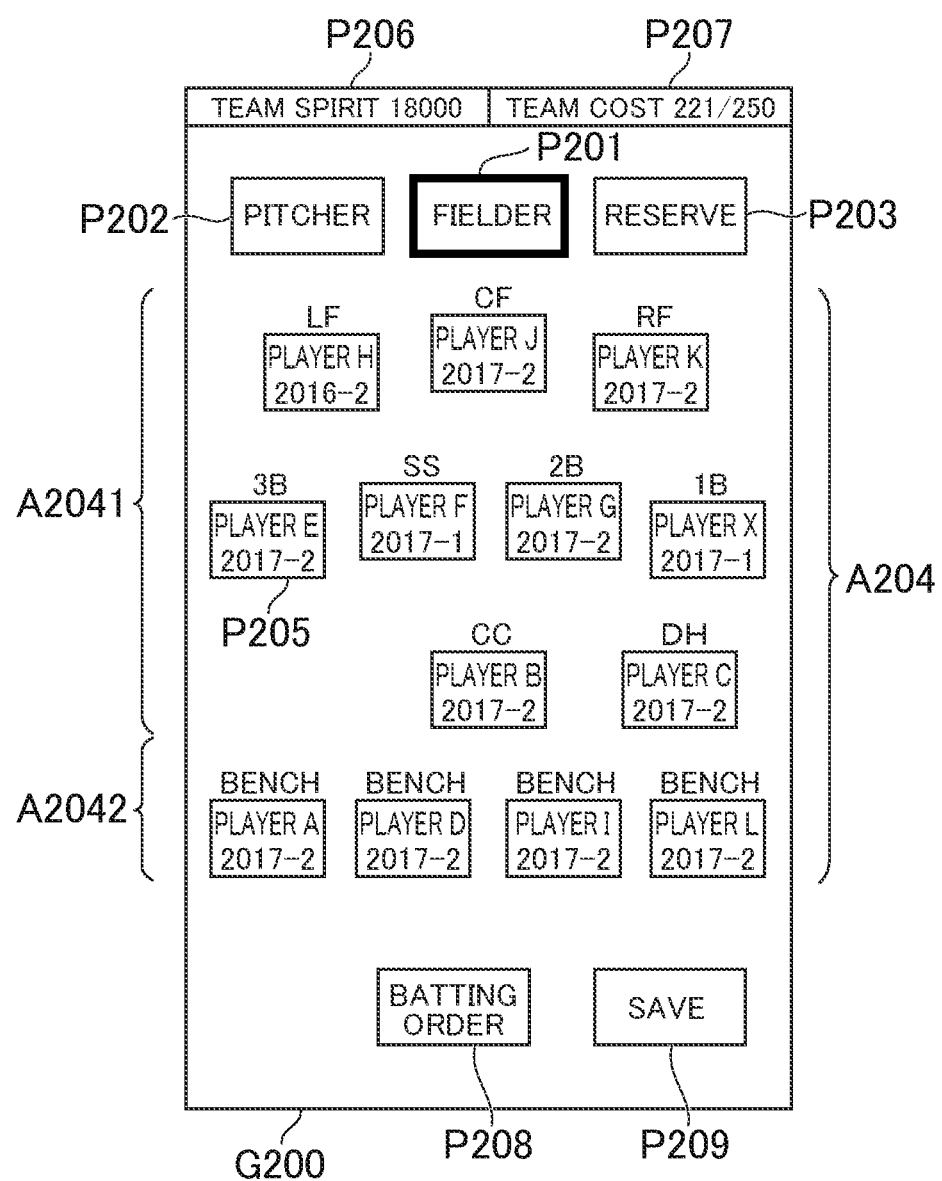
FIG. 4 is a diagram for illustrating an example of a team setting image.

FIG. 4 is a diagram for illustrating an example of a team setting image displayed on the display 35. As illustrated in FIG. 4, a team setting image G200 is an image for setting (forming) a team. That is, the team setting image G200 is an image for selecting the player characters to be registered as the fielder members or pitcher members of the team from among the player characters possessed by the user.

As illustrated in FIG. 4, the team setting image G200 includes parts P201 to P203 and an area A204. The parts P201 to P203 are parts for selecting any one of a pitcher, a fielder, and a substitute player.

In FIG. 4, there is illustrated a state in which the part P201 is selected. When the part P201 is selected, the player characters registered as fielder members of the team are displayed in the area A204. That is, a plurality of parts P205 corresponding to a plurality of respective player characters registered as fielder members of the team are displayed in the area A204.

In the example illustrated in FIG. 4, the name of the player character and the series name are displayed in each part P205. The "2016-2", "2017-1", and "2017-2" in FIG. 4 represent "2016 Series 2", "2017 Series 1", and "2017 Series 2", respectively. As illustrated in FIG. 4, not only player characters from the latest series "2017 Series 2", but also player characters from the old series "2016 Series 1" or "2017 Series 2" can be registered as team members. Although not shown in FIG. 4, an image, rank, and the like of the player character may be displayed in each part P205.

The area A204 in this case includes an area A2041 for starting members and an area A2042 for bench members. In the area A2041, parts P205 showing the player characters registered as the starting members are displayed. That is, one part P205 (one player character) is associated with each position. Meanwhile, parts P205 showing the player characters registered as bench members are displayed in the area A2042.

For example, the user can switch the position of a player character or switch a player character between a starting member and a bench member by dragging and dropping a part P205 onto another part P205. The user can also switch the player character corresponding to any one of the parts P205 to a reserve player character (a player character not registered as a team member among the player characters possessed by the user) by selecting the relevant part P205.

When the part P202 is selected, the player characters registered as the pitcher members of the team is displayed in the area A204. In this case, the player characters registered as a starting pitcher member, a middle relief pitcher member, and a closer pitcher member are displayed in the area A204. The user can switch player characters among the starting pitcher members, middle relief pitcher members, and closer pitcher members, and can also switch the player characters registered as the starting pitcher members, the middle relief pitcher members, or the closer pitcher members with a reserve player character.

When the part P203 is selected, the reserve player characters are displayed in the area A204. In this case, the user can switch any one of the player characters with a player character registered as a member of the team by selecting the relevant player character displayed in the area A204.

The team setting image G200 also includes parts P206 and P207. The part P206 shows a team spirit value, and the part P207 shows a team cost. The team spirit value is calculated by executing predetermined calculation processing based on the spirit parameter of each player character registered as a member of the team. For example, the team spirit value is the sum of the spirit parameters of each player character registered as a member of the team. Meanwhile, the team cost indicates the total cost of the player characters registered as a member of the team. The indication "221/250" indicates that the team cost is "221" and the upper limit cost is "250". In this case, the user is required to set the team members such that the team cost does not exceed the upper limit cost.

Further, the team setting image G200 also includes parts P208 and P209. The part P208 is a part for setting the batting order. When the part P208 is selected, an image for setting the batting order is displayed on the display 35. The part P209 is a part for saving team data. When the part P209 is selected, the team data set by the user is stored in the database DB (or storage 12, 32).

The user can perform a match against an opponent team by using his or her own team set in the manner described above (hereinafter referred to as "user team").

Figure 5:
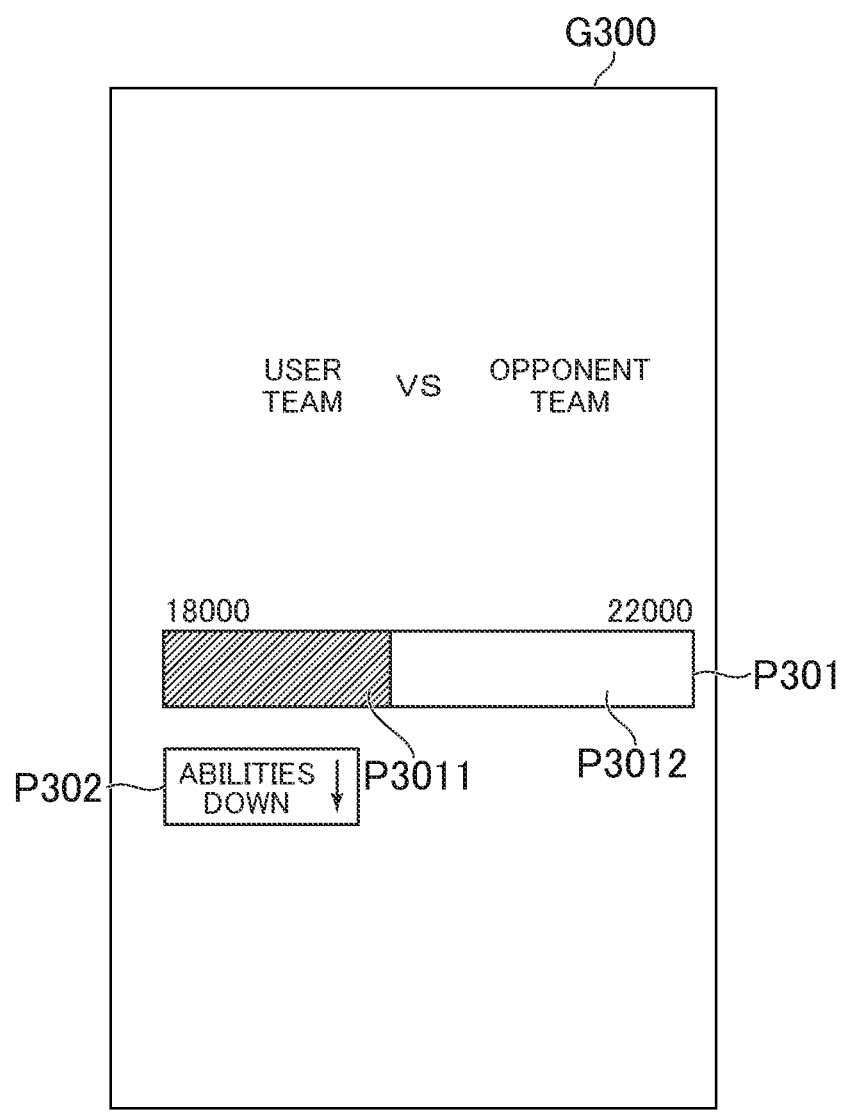
FIG. 5 is a diagram for illustrating an example of a match start image.

FIG. 5 is a diagram for illustrating an example of a match start image displayed on the display 35 at the start of a match. As illustrated in FIG. 5, a match start image G300 includes parts P301 and P302.

The part P301 indicates a comparison (high/low or large/small) between the team spirit value of the user team and the team spirit value of the opponent team. The numerical value (18,000) displayed at the left end of the part P301 indicates the team spirit value of the user team, and the numerical value (22,000) displayed at the right end of the part P301 indicates the team spirit value of the opponent team. The team spirit value of the opponent team is calculated in the same manner as in the team spirit value of the user team.

The length of a first portion P3011 (hatched portion) of the part P301 corresponds to the team spirit value of the user team, and the length of a second portion P3012 (non-hatched portion) corresponds to the team spirit value of the opponent team. In FIG. 5, there is illustrated a case in which the first portion P3011 is shorter than the second portion P3012, thus indicating that the user team has a lower team spirit value than that of the opponent team.

When the user team has a lower team spirit value than that of the opponent team, the abilities of each player character who is a member of the user team are reduced. In this case, the part P302 is displayed in association with the first portion P3011, and the user is notified that the user team is inferior. The user is also notified that the abilities of each player character of the user team have decreased.

Further, in this case, the amount of the reduction in ability is determined based on the difference in team spirit value between the user team and the opponent team. As the difference becomes larger, the reduction in ability becomes larger. For example, when the lower team spirit value is represented by TSL and the higher team spirit value is represented by TSH, an ability reduction rate (r) is determined by the following expression (1).

$$r = TSL/TSH \tag{1}$$

For example, in the example illustrated in FIG. 5, "TSH" is 22,000 and "TSL" is 18,000, and therefore the ability reduction rate (r) is "0.818". In this case, the values of the ability parameters of each player character of the user team are changed to the values obtained by multiplying the original value by the ability reduction rate (r). For example, when the original values of the contact parameter and the power parameter of the player character are "38" and "46", respectively, the contact parameter and the power parameter are reduced to "31" and "38", respectively. In the match that is about to start, the values of the ability parameters reduced as described above are used. The effect of the reduction in the ability parameters is temporary until the match ends, and when the match ends, the effect disappears.

When the opponent team has a lower team spirit value than that of the user team, the ability of each player character who is a member of the opponent team is similarly reduced.

The above description has been made on the assumption that a calculation expression, for example, the above-mentioned expression (1), is used. However, in place of a calculation expression, the ability reduction rate (r) may be determined based on information (data storage 100) having a table format determined in advance. That is, in place of the above-mentioned expression (1), the ability reduction rate (r) may be determined based on information having a table format showing a correspondence relationship between the team spirit value difference and the ability reduction rate (r). As another example, the ability reduction rate (r) may be set to a constant value regardless of the difference in team spirit value. The ability reduction rate (r) may also be, for example, a reduction rate of a batting average/slugging percentage of the user team, or a reduction rate of the mistake pitch rate/error rate of the opponent team.

The match starts after the match start image G300 is displayed. The match includes two parts, namely, an "automatic progress part" and an "action part" as described below.

The automatic progress part is a part in which the match automatically progresses. That is, in the automatic progress part, the match situation is updated without the user performing an operation during attack (a hitting operation or a base running operation) or an operation during defense (a pitching operation or a defense operation). In other words, in the automatic progress part, the match progress is automatically generated (determined) by the computer based on the parameters relating to the user team and the opponent team. In the automatic progress part, the user sees the match progress that is automatically generated by the computer.

Meanwhile, the action part is apart in which the user performs an operation during attack or defense. For example, during attack, the player character hits the ball or performs base running in accordance with the user operation (hitting operation or base running operation), and during defense, the player character performs pitching or defense in accordance with the user operation (pitching operation or defense operation). In this way, in the action part, the match situation is updated based on the operation performed on the player character by the user.

Figure 6:
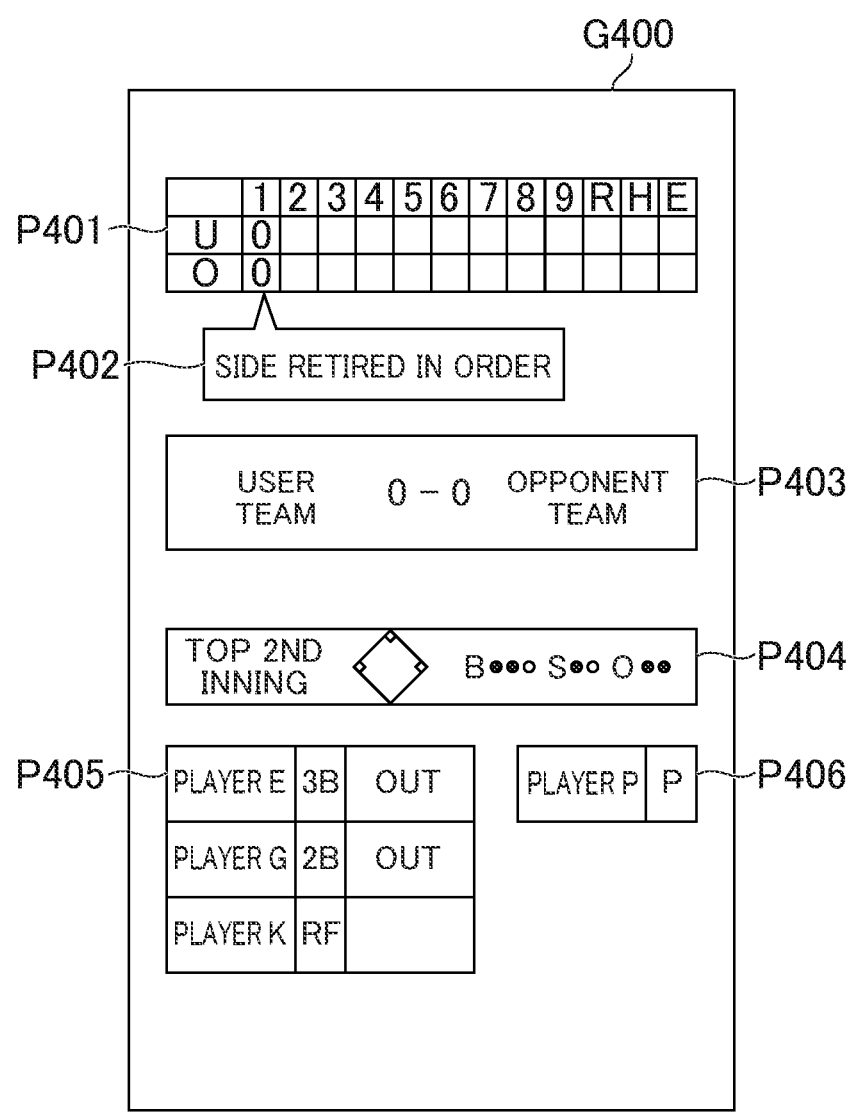
FIG. 6 is a diagram for illustrating an example of an automatic progress part image.

The match basically progresses in the automatic progress part, and only an outline of the match progress (match points) are presented to the user. FIG. 6 is a diagram for illustrating an example of an automatic progress part image displayed on the display 35 in the automatic progress part. As illustrated in FIG. 6, an automatic progress part image G400 includes parts P401 to P406 showing the outline of the match situation. The part P401 shows a scoreboard indicating the match progress. On the scoreboard, "U" indicates the user team and "O" indicates the opponent team. The part P402 is displayed in association with the scoreboard (part P401), and indicates events that occurred in the inning immediately before the current inning. The part P403 shows the current score of both teams. The part P404 shows the current inning, an on-base situation, a ball count, and an out count. The part P405 indicates each player character of the user team who has been at bat in the current inning (top of the second inning) and the result of each of those player characters. The part P406 shows the player character of the opponent team currently pitching.

For example, in the automatic progress part, the match progress is automatically determined by the computer virtually operating both the player characters of the user team and the player characters of the opponent team in a virtual space based on the ability parameters of those player characters. The match process may also be automatically determined by the computer simply comparing the ability parameters of the player characters between the user team and the opponent team.

As described above, at the start of the match, the ability parameters of the player characters of one of the user team and the opponent team are reduced based on the comparison result of the team spirit value between the user team and the opponent team (match start image G300), and in the automatic progress part, the match progress is determined by the computer based on the reduced ability parameters.

In the automatic progress part, the display content of the automatic progress part image G400 is updated in accordance with the match progress automatically generated as described above. The user sees the outline of the match progress determined by the computer while viewing the parts P401 to P406 of the automatic progress part image G400 displayed on the display 35. When the match situation reaches a predetermined situation in the automatic progress part, the automatic progress part switches to the action part, and the user is given an opportunity to perform an operation that can be performed on the player character. The "predetermined situation" is, for example, a situation in which there is a scoring chance for the user team, a situation in which a scoring chance for the user team can be easily created, a situation in which the opponent team has a scoring chance, and the like.

For example, the action part is set to at-bat units or inning units. In the case of at-bat units, the user operates a player character (batter or pitcher) until one at-bat is completed. In the case of inning units, the user operates a player character until the top or bottom of one inning is completed. The action part may be also set to out units, and the user may operate a player character until the out count increases by one.

Figure 7:
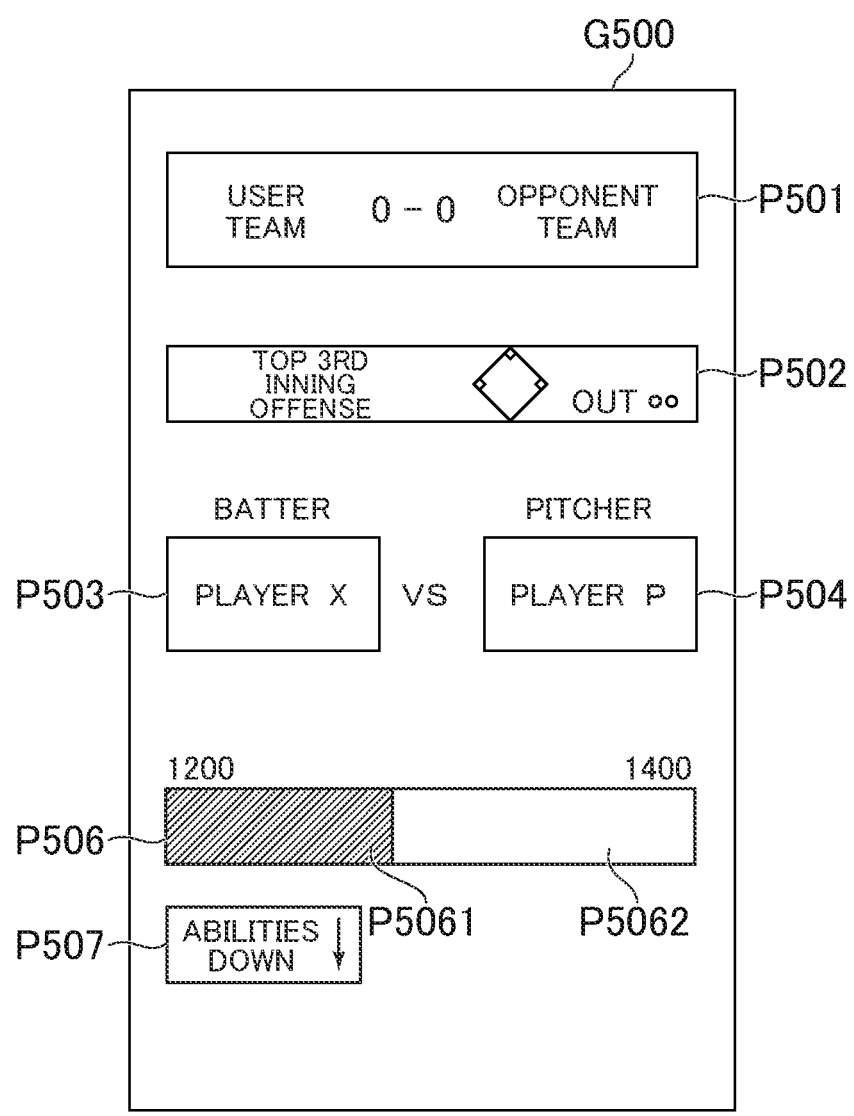
FIG. 7 is a diagram for illustrating an example of an action part start image.

FIG. 7 is a diagram for illustrating an example of an action part start image displayed on the display 35 when the action part starts. In FIG. 7, there is illustrated a case in which the user team is attacking.

As illustrated in FIG. 7, an action part start image G500 includes parts P501 to P507. The part P501 shows the current score of both teams. The part P502 shows the current inning, the on-base situation, and the out count. The part P503 shows the player character (batter character) of the user team who is at bat. The part P504 shows the player character (pitcher character) of the opponent team on the mound as the pitcher.

The part P506 in this case shows a comparison (high/low or large/small) between the spirit parameter of the batter character (player character of the user team) and the spirit parameter of the pitcher character (player character of the opponent team). The numerical value (1,200) displayed at the left end of the part P506 indicates the spirit parameter of the batter character. The numerical value (1,400) displayed at the right end of the part P506 indicates the spirit parameter of the pitcher character.

The length of a first portion P5061 (hatched portion) of the part P506 corresponds to the value of the spirit parameter of the batter character, and the length of a second portion P5062 (solid portion) corresponds to the value of the spirit parameter of the pitcher character. In FIG. 7, there is illustrated a case in which the first portion P5061 is shorter than the second portion P5062, thus indicating that the batter character has a lower spirit parameter value than that of the pitcher character.

When the value of the spirit parameter of the batter character is less than that of the pitcher character, the abilities of the batter character are reduced. In this case, the part P507 is displayed in association with the first portion P5061, and the user is notified that the batter character is inferior. The user is also notified that the abilities of the batter character have been reduced.

In this case, the amount of reduction in the ability is determined based on the difference in the value of the spirit parameter between the batter character and the pitcher character. As the difference becomes larger, the reduction in ability becomes larger. For example, when the value of the lower spirit parameter is represented by PSL and the value of the higher spirit parameter is represented by PSH, the ability reduction rate (r) is determined by the following expression (2) or (3).

$$r=PSL/PSH \quad (2)$$

$$r=1-((PSH-PSL)*0.05)) \quad (3)$$

For example, in the case of the expression (2), in the example illustrated in FIG. 7, "PSH" and "PSL" are 1,400 and 1,200, respectively, and therefore the ability reduction rate (r) is "0.857". In this case, for this action part only, the values of the ability parameters of the batter character are set to values obtained by multiplying the original value by the ability reduction rate (r). For example, when the original values of the contact parameter and the power parameter of the batter character are "38" and "46", respectively, the contact parameter and the power parameter are reduced to "33" and "39", respectively. Then, in the action part, the reduced ability parameters are used. That is, in the automatic progress part, the ability parameters reduced based on the result of comparing the team spirit value between the teams are used, but in the action part, the ability parameters reduced based on the result of comparing the spirit parameter between the player characters are used.

When the pitcher character has a lower spirit parameter than that of the batter character, the abilities of the pitcher character are similarly reduced.

The above description has been made on the assumption that a calculation expression such as the above-mentioned expression (2) or (3) is used. However, in place of a calculation expression, the ability reduction rate (r) may be determined based on information (data storage 100) having a table format determined in advance. That is, in place of expression (2) or (3), the ability reduction rate (r) may be determined based on information having a table format showing a correspondence relationship between the spirit parameter difference and the ability reduction rate (r). As another example, the ability reduction rate (r) may be set to a constant value regardless of the difference in the spirit parameter. The ability reduction rate (r) may also be, for example, a reduction rate of a batting average/slugging percentage of the batter character, or a reduction rate of the mistake pitch rate/error rate of the pitcher character.

Figure 8:
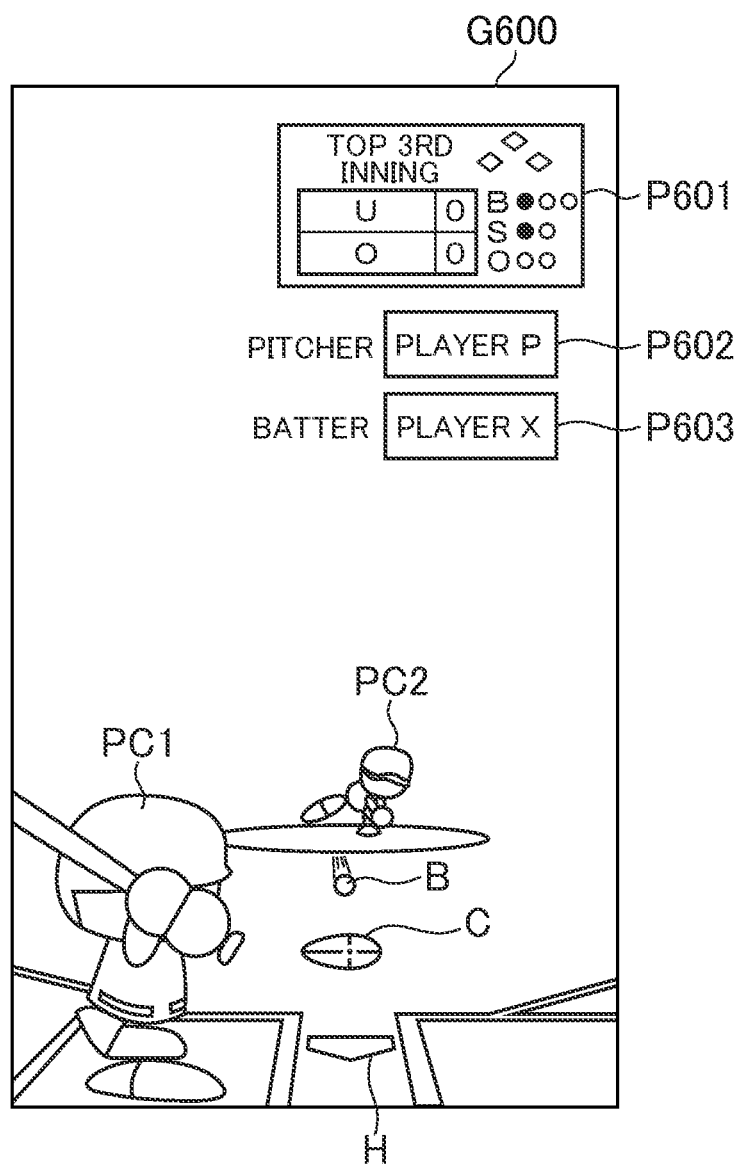
FIG. 8 is a diagram for illustrating an example of an action part image.

After the display of the action part start image G500, an action part image in which the user operates a player character is displayed on the display 35. FIG. 8 is a diagram for illustrating an example of an action part image displayed when the user team is attacking. In FIG. 8, there is illustrated a situation in which the user performs an operation on a batter character PC1.

As illustrated in FIG. 8, an action part image G600 includes parts P601 to P603. The part P601 shows the current match situation. The parts P602 and P603 show the names of a pitcher character PC2 and the batter character PC1, respectively.

In this case, the batter character PC1 operated by the user and the pitcher character PC2 of the opponent team are displayed in the action part image G600. In addition, a cursor C is displayed as an operation image for causing the batter character PC1 to perform hitting. The cursor C moves in accordance with a movement designation operation by the user, and indicates a hitting position. When the user performs a swing designation operation, the batter character PC1 swings the bat toward the hitting position indicated by the cursor C. When the user performs a swing designation operation at or close to the timing at which a ball B thrown by the pitcher character PC2 passes through a home plate H, the batter character PC1 hits the ball B in accordance with a positional relationship between the cursor C and the ball B. For example, when the cursor C overlaps the ball B, the ball B is hit.

The hitting operation described here is an example, and another type of hitting operation may be adopted. In FIG. 8, there is illustrated a case in which the user team is attacking, but when the user team is defending, an action part image for the user to perform an operation on the pitcher character is displayed.

The user performs an operation on the batter character while viewing the action part image G600. When the action part ends, the automatic progress part image G400 is displayed on the display 35, and the automatic progress part is restarted.

The spirit parameter is now described. FIG. 9 is a table for showing an example of the spirit parameter of the player characters of each series. In FIG. 9, "LvMAX" indicates a state in which the level of the player character has reached the initial upper limit level. Further, "Super 1" is a state in which the upper limit level is the initial upper limit level +1 and the level of the player character has reached that upper limit level. Similarly, "Super 2" is a state in which the upper limit level is the initial upper limit level +2 and the level of the player character has reached that upper limit level. The same applies to "Super 3", "Super 4", and "Super 5".

As shown in FIG. 9, the spirit parameter has a positive correlation with the rank, the level, and the special training level. For example, among the player characters of the same series, when the level and the special training level are the same, the player character with the higher rank has the higher spirit parameter. Further, among the player characters of the same series, when the rank is the same, the player character with the higher level or the higher special training level has the higher spirit parameter.

In FIG. 9, the spirit parameter is shown for a case in which the player character level is 1 (Lv1) and for a case in which the player character level is at the upper limit level (LvMAX). Although the spirit parameter between the Lv1 and the LvMAX (for example, Lv2) is not shown in FIG. 9, the spirit parameter gradually increases as the level of the player character increases. The spirit parameter increases but does not decrease. In this regard, the spirit parameter is different from a parameter that increases or decreases during the game, for example, a form parameter (condition parameter) of a player character in a baseball game, a soccer game, or the like.

Among the player characters of the same series, player characters having an "S" rank and a "Super 5" level have the highest spirit parameter, and player characters having a "D" rank and a "1" level have the lowest spirit parameter.

Between different series, when the rank, the level, and the special training level are the same, player characters from the newer series have a higher spirit parameter than player characters from the older series. For example, the maximum value of the spirit parameter is "2,400" in "2017 Series 1", but is "2,600" in "2017 Series 2", and hence "2017 Series 2" is higher than "2017 Series 1" in terms of the spirit parameter. The minimum value of the spirit parameter is "1,000" in "2017 Series 1", but is "1,200" in "2017 Series 2", and hence "2017 Series 2" is higher than "2017 Series 1" in terms of the spirit parameter.

In the baseball game described above, at the start of the match, based on the result of a comparison of the team spirit value between the user team and the opponent team, the abilities of the player characters having the lower team spirit value are reduced. At this time, as the value of the spirit parameter of each player character of the user team becomes higher, the team spirit value of the user team becomes the higher. This means that the abilities of the player characters of the user team are less likely to be reduced, which is advantageous for the user.

Further, in the action part, based on the result of a comparison of the spirit parameter between the player character of the user and the player character of the opponent, the abilities of the player character having the lower spirit parameter are reduced. At this time, as the spirit parameter of the player character of the user becomes higher, the abilities of the player characters of the user become less likely to be reduced, which is advantageous for the user.

As described above, in the baseball game described above, as the spirit parameter of the player character who is a member of the user team becomes higher, the user has more advantages. In this regard, as shown in FIG. 9, between different series, when the rank, the level, and the special training level are the same, through setting a higher spirit parameter for player characters from the newer series than for player characters from the older series, the user can be prompted to use player characters from the new series as members of the user team. That is, the user can be urged to use player characters from the latest series as members of the user team.

[1-3. Functional Blocks] FIG. 10 is a functional block diagram for illustrating functional blocks related to the above-mentioned functions among the functional blocks to be implemented in the game system 1.

Figure 10:
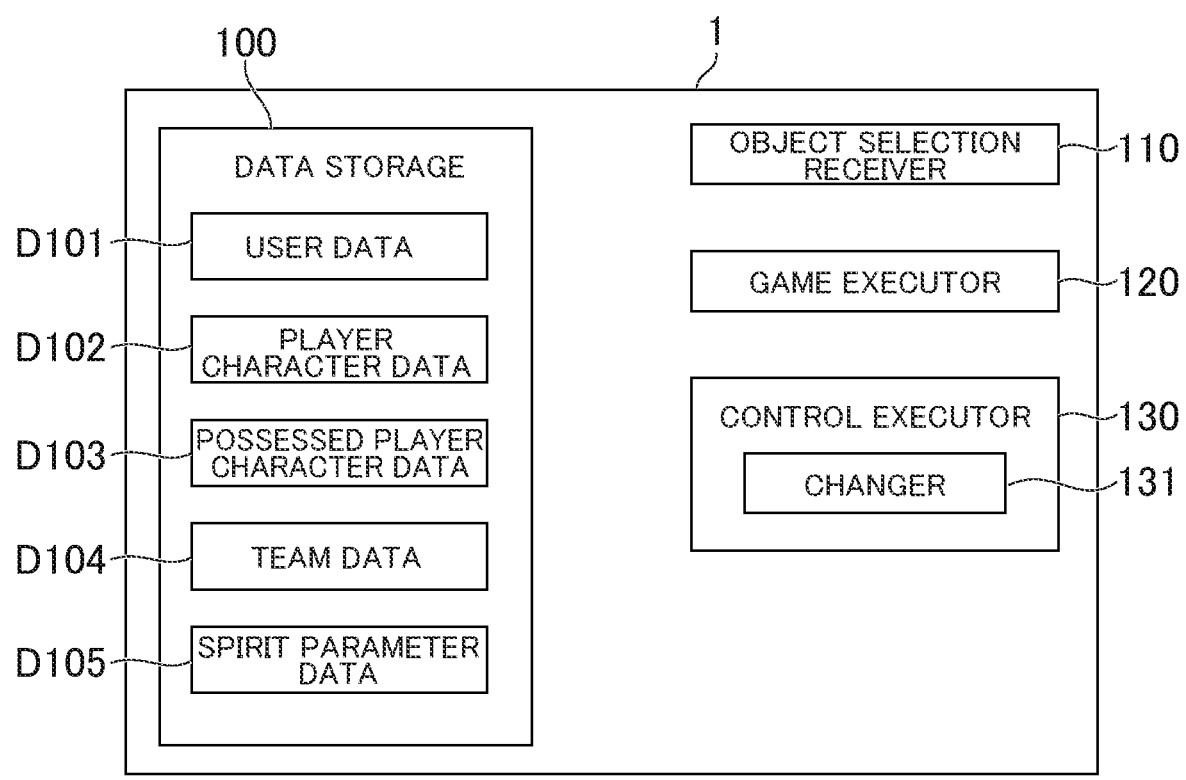
FIG. 10 is a functional block diagram of the game system according to an embodiment of the present invention.

[1-3-1] As illustrated in FIG. 10, the game system 1 includes a data storage 100. For example, the data storage 100 is implemented by at least one of the database DB, the storage 12, and the storage 32. The data storage 100 is configured to store data required for providing a game.

As a specific example of the data stored in the data storage 100, there is now given a description of data required for providing the baseball game described above. As illustrated in FIG. 10, the data storage 100 stores user data D101, player character data D102, possessed player character data D103, team data D104, and spirit parameter data D105.

[1-3-1-1] FIG. 11 is a table for showing an example of the user data D101. The user data D101 is data indicating a list of users playing the game on the game system 1. As shown in FIG. 11, the user data D101 includes a "user ID", a "user name", "game points", "game items", and "upper limit cost" fields.

The "user ID" field indicates identification information for uniquely identifying each user. The "user name" field indicates the name of the user. The "game points" field indicates the amount of game points possessed by the user. The "game item" field indicates a list of the game items possessed by the user. The "game points or game items possessed by the user" indicates the game points or the game items freely usable (consumable) by the user. The "upper limit cost" field indicates the upper limit value of the team cost at the time when the user forms a team.

Figure 12:
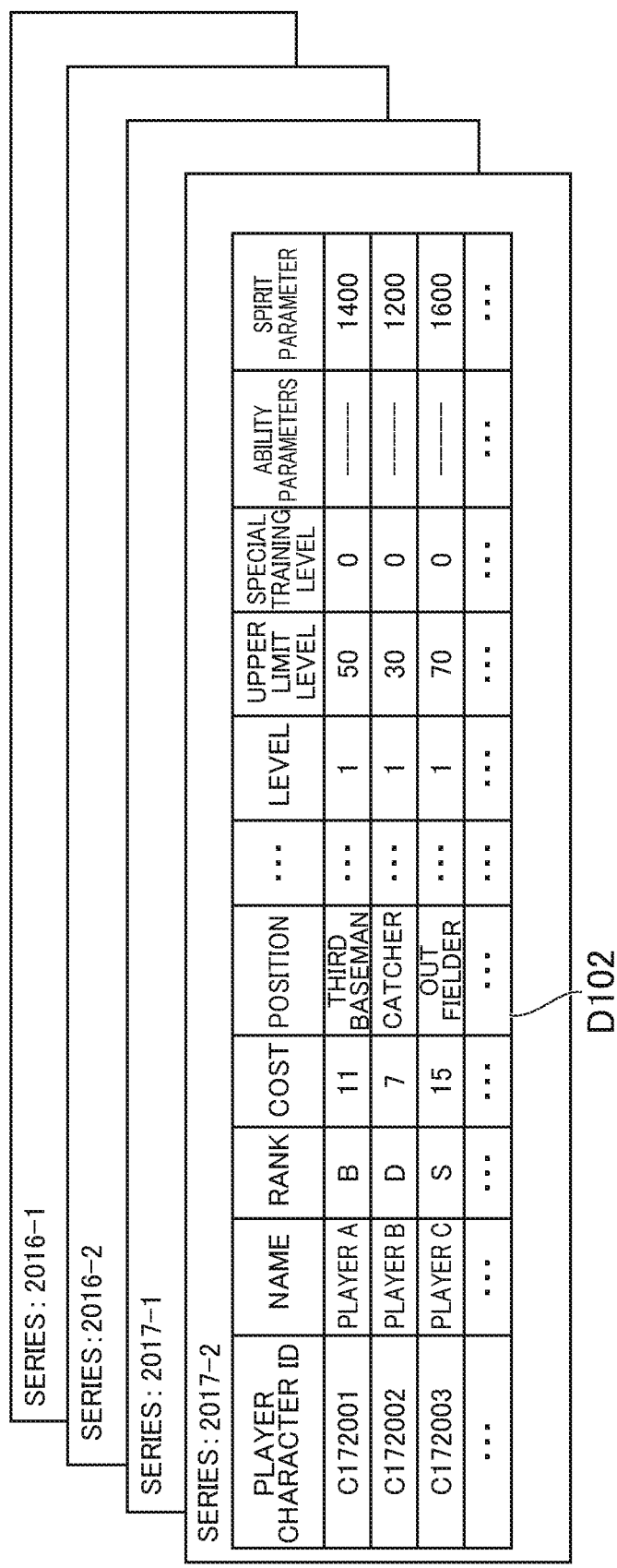
FIG. 12 is a table for showing an example of player character data.

[1-3-1-2] FIG. 12 is a table for showing an example of the player character data D102. The player character data D102 is data indicating a player character group currently being provided by the game system 1 or a player character group provided in the past by the game system 1. As shown in FIG. 12, the player character data D102 is stored for each series. The player character data D102 includes "player character ID", "name", "rank", "cost", "position", "level", "upper limit level", "special training level", "ability parameters", and "spirit parameter" fields.

The "player character ID" field indicates identification information for uniquely identifying the player character. Even for player characters corresponding to the same real player, when the series is different, different player character IDs are set. The "name", "rank", "cost", and "position" fields indicate the name, rank, cost, and appropriate position of the player character, respectively. The "level", "upper limit level", and "special training level" fields indicate the initial values of the level, upper limit level, and special training level of the player character, respectively.

The "ability parameters" field indicates the initial values of the ability parameters of the player character. Regarding fielder player characters, parameters indicating the level of ability as a fielder (for example, field parameter, trajectory parameter, contact parameter, power parameter, and running speed parameter) and a parameter indicating the presence/absence of a special ability as a fielder are registered in the "ability parameters" field. Regarding pitcher player characters, parameters indicating the level of ability as a pitcher (for example, top speed parameter, ball control parameter, and stamina parameter) and a parameter indicating the presence/absence of a special ability as a pitcher are registered in the "ability parameters" field. The "spirit parameter" field indicates the initial value of the spirit parameter of the player character.

Although not shown in FIG. 12, fields other than the fields described above are also included in the player character data D102. For example, a field indicating a player character's dominant arm or form (hitting or pitching form) is also included in the player character data D102.

[1-3-1-3] FIG. 13 is a table for showing an example of the possessed player character data D103. The possessed player character data D103 is data indicating a list of the player characters possessed by the user. As shown in FIG. 13, the possessed player character data D103 is stored for each user (in association with the user ID). The possessed player character data D103 includes "serial number", "player character ID", "name", "series", "rank", "cost", "position", "experience value", "level", "upper limit level", "special training level", "ability parameters", and "spirit parameter" fields.

The "serial number" field indicates a serial number for uniquely identifying the player character possessed by the user. When the user possesses a plurality of the same player characters, the player character IDs of those player characters are the same, but the serial numbers are different. The "series" field indicates which series the player character is from. The "experience value" field indicates the total experience value that has been given to the player character. The other fields are the same as those for the player character data D102, and thus a description thereof is omitted here. However, the player character's experience value, level, upper limit level, special training level, ability parameters, and spirit parameter are updated by appearing in a match or by performing special training.

[1-3-1-4] FIG. 14 is a table for showing an example of the team data D104. The team data D104 is data of the baseball team set by the user. As shown in FIG. 14, the team data D104 is stored for each user (in association with the user ID). The team data D104 includes member data D1041 and team spirit value data D1042.

The member data D1041 indicates the player characters selected as pitcher members (starting pitcher members, middle relief pitcher members, and closer pitcher members) and fielder members (starting members and bench members) of the team from among the player characters possessed by the user. The member data D1041 also indicates the batting order set by the user. The team spirit value data D1042 indicates the team spirit value.

[1-3-1-5] The spirit parameter data is data indicating a correspondence relationship between the series, rank, level, and special training level and the spirit parameter, like that shown in FIG. 9, for example.

[1-3-1-6] Data other than the data described above is also stored in the data storage 100. For example, data indicating a competition history of the user is also stored in the data storage 100.

[1-3-2] As illustrated in FIG. 10, the game system 1 includes an object selection receiver 110, a game executor 120, and a control executor130. Those functional blocks are implemented by the server 10 or the game terminal 30. In another case, a part of those functional blocks may be implemented by the controller 31 of the game terminal 30, while the rest of the functional blocks may be implemented by the controller 11 of the server 10. In yet another case, all of those functional blocks may be implemented by the controller 11 of the server 10, or all of those functional blocks may be implemented by the controller 31 of the game terminal 30.

[1-3-2-1] The object selection receiver 110 is configured to receive a selection of one or a plurality of objects as an object to be used in the game.

An "object" is something that is used in the game. For example, a game character, a game card, or a game item are examples of the "object".

For example, the "object" is an object corresponding to a real person. In other words, the "object" is an object created based on a real person. That is, the object reflects the characteristics of the real person. For example, the object is an object in which parameters (for example, ability parameters) are set based on an actual performance achieved by the real person. Specifically, a game character or a game card obtained by converting a real person into a character or a card is an example of an "object corresponding to a real person".

A "real person" is, for example, a famous person in the real world. For example, a real-world athlete, fighter, or entertainer is an example of a "real person". A person who actually existed in the past is also an example of a "real person". That is, a famous person in history is also an example of a "real person".

When the "real person" is an athlete, the actual performance achieved by the athlete in one or a plurality of matches (such as a league match or a tournament match) is an example of the "actual performance of a real person". That is, the statistics and evaluation points in one or a plurality of matches correspond to an example of the above-mentioned "actual performance".

For example, for a baseball game, a game character (or a game card) corresponding to a real baseball player is an example of the "object corresponding to a real person". In this case, the ability parameters of the game character are set based on the actual results achieved in matches by the baseball player (actual results achieved as a fielder (batting average, runs batted in, number of home runs, number of strikeouts, number of stolen bases, or number of errors) or actual results achieved as a pitcher (for example, earned run average, number of wins, number of strikeouts, number of base on balls (BB) plus hit by pitch (HBP), or ball speed).

For example, for a soccer game, a game character (or a game card) corresponding to a real soccer player is an example of the "object corresponding to a real person". In this case, the ability parameters of the game character are set based on the actual results achieved in matches by the soccer player (for example, number of goals, number of assists, number of shots, pass success rate, or number of fouls).

The "object" is not required to be an object corresponding to a real person. The object may be a fictitious person or a living creature.

Each object is associated with a first parameter and a second parameter. The "first parameter" and the "second parameter" are parameters set for the object. In other words, the "first parameter" and the "second parameter" are parameters stored in association with identification information on the object. The "first parameter" and the "second parameter" are set for each object. The values of the "first parameter" and the "second parameter" are different for each object.

For example, the "first parameter" is an ability parameter indicating the level of various abilities and the presence/absence of a specific ability of an object. When the object is an object corresponding to a real person, the value of the "first parameter" of the object is set based on the actual performance achieved by that person. For example, the first parameter (an ability parameter) is set such that the better actual performance leads to the better ability (or a specific ability is gained). For example, the "first parameter" of an object provided during a specific period is set based on the actual performance of the person in a first period. Further, the "first parameter" of the object provided in a period other than the specific period is set based on the actual performance of the person in a second period. In this case, the "second period" is a period other than the "first period". For example, the "second period" is a period after the "first period". The "second period" may also be a period before the "first period".

Meanwhile, the "second parameter" is a parameter different from the "first parameter", and is a parameter to be used in order to change the first parameter.

The "second parameter" is at least one of a parameter having a value that is inhibited from decreasing during the game or a parameter having a value that is inhibited from increasing during the game. "At least one of a parameter having a value that is inhibited from decreasing during the game or a parameter having a value that is inhibited from increasing during the game" is any one of "a parameter having a value that may increase but not decrease during the game", "a parameter having a value that may decrease but not increase during the game", and "a parameter having a value that does not decrease or increase during the game".

In this case, "a value that does not decrease during the game" means that the value is not reduced by the game processing (game program). That is, the value is not reduced by the controller 31 or 11 executing the game program. In addition, the value is not reduced by the user playing the game. Similarly, "a value that does not increase during the game" means that the value is not increased by the game processing (game program). That is, the value is not increased by the controller 31 or 11 executing the game program. In addition, the value is not increased by the user playing the game.

For this reason, the "second parameter" is different from a parameter that fluctuates up and down during the game (i.e., a parameter that increases or decreases during the game), such as a form parameter (condition parameter) of a player character in a baseball game, a soccer game, or other such game.

The "object to be used" is, for example, a game character to be used by the user in the game. For example, in the case of a game in which the user competes with an opponent by using one game character, the one game character is an example of "object to be used". As another example, in the case of a game in which the user forms a group (or a team or a party) from a plurality of game characters and uses the formed group to compete against an opponent, the plurality of game characters included in the formed group is an example of the "object to be used".

The "object to be used" may also be, for example, a game card or a game item to be used by the user in the game. For example, in the case of a card game in which the user forms a deck from a plurality of game cards and uses the formed deck to compete against an opponent, the plurality of game cards in the deck is an example of the "object to be used".

The statement "receive a selection of one or a plurality of objects" means, for example, receiving an operation of selecting one or a plurality of objects. This may also mean receiving data indicating that one or a plurality of objects have been selected.

In the case of the baseball game described above, the player character corresponds to an example of the "object", the ability parameters correspond to an example of the "first parameter", and the spirit parameter corresponds to an example of the "second parameter". The team members (starter pitcher members, middle relief pitcher members, closer pitcher members, fielder starting members, and bench members) correspond to an example of the "object to be used". The object selection receiver 110 receives a selection of a player character to be registered as a team member from among the player characters possessed by the user.

[1-3-2-2] The game executor 120 executes the game based on the object to be used.

The statement "executes the game based on the object to be used" means, for example, executing the game based on the parameters of the one or plurality of objects selected as the object to be used. The statement "parameters of a plurality of objects" means the parameters of each of the plurality of objects.

For example, the game executor 120 executes the game based on the first parameter of the object to be used.

The statement "executes the game based on the first parameter of the object to be used" means, for example, executing control relating to the object to be used based on the first parameter of the object to be used. For example, in the case of a baseball game, this means controlling the flight distance of a ball hit by the player character, the speed or amount of curve of a ball pitched by the player character, and the like based on the ability parameters (first parameter) of the player character. Further, in the case of a soccer game, this means, for example, controlling the accuracy of a shot or a pass by a player character based on the ability parameters (first parameter) of the player character. When the first parameter of the object to be used is changed by a changer 131, the game executor 120 executes the game based on the first parameter changed by the changer 131.

In the case of the baseball game described above, the game executor 120 executes a match between the user team and the opponent team based on the ability parameters of the player characters registered as the members of the user team.

[1-3-2-3] The control executor 130 is configured to execute control in the game such that the game is more advantageous to the user when an object provided during a specific period is not included in the object to be used compared with when the object provided during the specific period is included in the object to be used.

For example, when the user is to be urged to acquire and use an object provided after a specific point in time rather than an object provided before the specific point in time, the period before the specific point in time is set as the "specific period". As another example, when the user is to be urged to acquire and use an object provided before a specific point in time rather than an object provided after the specific point in time, the period after the specific point is set as the "specific period". As yet another example, when the user is to be urged to acquire and use an object provided during a certain period, a period other than that period is set as the "specific period".

The "object provided during a specific period" is an object that is selectable as the object to be used by the user during a specific period. For example, in the case of a game in which an object is given to a user from among candidate objects and the user can select the given object as the object to be used, the "object provided during a specific period" is the object given to the user in the specific period. The objects in the lineup of candidate objects during the specific period can also be referred to as the "object provided during a specific period".

The "control such that the game is more advantageous to the user" means, for example, in the case of a game in which the user aims to achieve a predetermined objective by using the object to be used, changing a parameter such that it is easier for the user to achieve the objective.

Specifically, for example, a parameter is changed such that an ability of the object to be used is increased (or a special ability of the object to be used becomes usable), or such that it becomes easier to increase an ability of the object to be used (or the special ability of the object to be used becomes usable).

As another example, in the case of a game in which the user and an opponent aim to compete against each other and win by using an object to be used possessed by themselves, a parameter may be changed such that an ability of the object to be used by the opponent decreases (or a specific ability of the object to be used by the opponent is no longer usable), or such that it becomes easier to reduce an ability of the object to be used by the opponent (or the specific ability of the object to be used by the opponent is no longer usable).

In addition, in the case of a game in which the user aims to conquer an enemy, a game in which the user aims to obtain a specific game item, or a game in which the user aims to clear a game event, a parameter may be changed such that an enemy strength becomes weaker or the difficulty of obtaining the specific game item or the difficulty of clearing the game event is reduced.

[1-3-2-4] The control executor 130 includes the changer 131. The changer 131 is configured to change, based on a comparison result between a value acquired based on the second parameter of the object to be used and a value to be compared, the first parameter of the object to be used at the time of executing the game from a value set in advance.

The "value acquired based on the second parameter of the object to be used" may be the value per se of the second parameter of one object to be used, a value calculated by executing calculation processing based on the second parameter of one object to be used, or a value calculated by executing calculation processing based on each second parameter of a plurality of objects to be used.

The "value to be compared" is the value to be compared with the value acquired based on the second parameter of the object to be used. The "value to be compared" may be calculated each time or may be a value determined in advance.

For example, in the case of a competitive game to be executed based on one or a plurality of objects to be used by the user and one or a plurality of objects to be used by the opponent, a value acquired based on the second parameter of the object (s) to be used by the opponent is used as the "value to be compared" with the value acquired based on the second parameter of the object (s) to be used by the user.

The "comparison result" may be a determination result as to whether or not the value acquired based on the second parameter of the object to be used is smaller than the value to be compared, or may be the determination result as to whether or not the value is larger than the value to be compared.

The statement "change, based on a comparison result, the first parameter of the object to be used at the time of executing the game from a value set in advance" means, for example, determining based on the comparison result whether or not to change the first parameter of the object to be used at the time of executing the game from the value set in advance, or determining based on the comparison result the change method or the change amount at the time of changing the first parameter of the object to be used at the time of executing the game from the value set in advance.

For example, when the value acquired based on the second parameter of the object to be used is smaller than the value to be compared, the first parameter of the object to be used at the time of executing the game may be reduced from the value set in advance. Further, the first parameter of the object to be used at the time of executing the game may be reduced from the value set in advance only in cases in which the value acquired based on the second parameter of the object to be used is smaller than the value to be compared and the difference therebetween is equal to or more than a predetermined value. In addition, the first parameter of the object to be used at the time of executing the game may be increased rather than reduced from the value set in advance.

As another example, when the value is larger than the value to be compared, the first parameter of the object to be used at the time of executing the game may be increased from the value set in advance. Further, the first parameter of the object to be used at the time of executing the game may be increased from the value set in advance only in cases in which the value acquired based on the second parameter of the object to be used is larger than the value to be compared and the difference therebetween is equal to or more than a predetermined value. In addition, the first parameter of the object to be used at the time of executing the game may be reduced rather than increased from the value set in advance.

As yet another example, the amount by which the first parameter of the object to be used at the time of executing the game is to be increased or reduced from the value set in advance may be set in accordance with the difference between the value acquired based on the second parameter of the object to be used and the value to be compared. For example, as the difference between the value acquired based on the second parameter of the object to be used and the value to be compared becomes larger, the amount by which the first parameter of the object to be used at the time of executing the game is to be increased or reduced from the value set in advance may be set to become larger. In other words, as the difference between the value acquired based on the second parameter of the object to be used and the value to be compared becomes smaller, the amount by which the first parameter of the object to be used at the time of executing the game is to be increased or reduced from the value set in advance may be set to become smaller.

The correspondence relationship between the comparison result and the manner of changing the first parameter is set in accordance with the meaning of the first parameter and the second parameter in the game. For example, in a game in which a larger value of the first parameter and a larger value of the second parameter are more advantageous in the game, when the value acquired based on the second parameter of one or a plurality of objects is larger than the value to be compared, the first parameter of the one or plurality of objects at the time of executing the game may be increased from the value set in advance, and when that value is smaller than the value to be compared, the first parameter of the one or plurality of objects at the time of executing the game may be reduced from the value set in advance.

The "value set in advance" is a value set in advance by the game developer or other such party, or is a value updated and set in accordance with game progress.

For example, when the game is a competitive game to be executed based on an object to be used by the user and an object to be used by the opponent, the changer 131 changes, from the value set in advance, based on a comparison result between a value acquired based on the second parameter of the object to be used by the user and a value acquired based on the second parameter of the object to be used by the opponent, at least one of the first parameter of the object to be used by the user or the first parameter of the object to be used by the opponent at the time of executing the game.

The term "competition" means determining a win or a loss against an opponent. It is not always required that the competition end in a win or a loss, and there may be cases in which the competition ends in a draw. For example, a match in a sports game and a competition in a card game are examples of a "competition".

The "opponent" is the party competing against the user. That is, the opponent is the party against which a win or a loss by the user is to be determined. The opponent may be another user or a computer.

For example, in the case of a game in which a competition is performed between teams, such as a baseball game or a soccer game, the game characters belonging to the team to be designated (operated) by the user correspond to the "object to be used by the user", and the game characters belonging to the team to be designated by the opponent correspond to the "object to be used by the opponent".

As another example, in the case of each at-bat in a baseball game, the batter character (or the pitcher character) to be designated by the user corresponds to the "object to be used by the user", and the pitcher character (or the batter character) to be designated by the opponent corresponds to the "object to be used by the opponent".

As yet another example, in the case of a game in which a competition is performed between individual game characters, the game character to be designated by the user corresponds to the "object to be used by the user", and the game character to be designated by the opponent corresponds to the "object to be used by the opponent".

As still yet another example, in the case of a card game in which the user and an opponent compete by each using their own deck, the game cards of the deck to be used by the user correspond to the "object to be used by the user", and the game cards of the deck to be used by the opponent correspond to the "object to be used by the opponent".

As still yet another example, in the case of a game in which the user and an opponent compete by each using their own game items, the game items to be used by the user correspond to the "object to be used by the user", and the game items to be used by the opponent correspond to the "object to be used by the opponent".

The "competitive game to be executed based on an object to be used by the user and an object to be used by the opponent" is, for example, a competitive game that progresses by the user operating the object to be used by the user, and the opponent operating the object to be used by the opponent. As another example, the "competitive game" may be a competitive game that automatically progresses by a computer operating both the object to be used by the user and the object to be used by the opponent. As yet another example, the "competitive game" may be a competitive game in which the competition result is automatically determined by executing simulation processing based on the object to be used by the user and the object to be used by the opponent. The "competitive game" may also be a competitive game that generally automatically progresses by a computer operating both the object to be used by the user and the object to be used by the opponent, but in certain specific situations the user (or the opponent) operates his or her own object to be used. As another example, the competitive game may be a competitive game in which competition progress is generally automatically determined by executing simulation processing based on the object to be used by the user and the object to be used by the opponent, but in certain specific situations the user (or the opponent) operates his or her own object to be used.

The statement "changes from the value set in advance, based on a comparison result between a value acquired based on the second parameter of the object to be used by the user and a value acquired based on the second parameter of the object to be used by the opponent, at least one of the first parameter of the object to be used by the user or the first parameter of the object to be used by the opponent at the time of executing the game" means that when, for example, the value acquired based on the second parameter of the object to be used by the user (hereinafter referred to as "user value") is larger than the value acquired based on the second parameter of the object to be used by the opponent (hereinafter referred to as "opponent value"), reducing the first parameter of the object to be used by the opponent at the time of executing the game from the value set in advance. In this case, the first parameter of the object to be used by the user at the time of executing the game may be increased from the value set in advance.

Further, the above-mentioned term "change" may mean to, for example, when the user value is smaller than the opponent value, reduce the first parameter of the object to be used by the user at the time of executing the game from the value set in advance. In this case, the first parameter of the object to be used by the opponent at the time of executing the game may be increased from the value set in advance.

In the case of the baseball game described above, when the match is started, the changer 131 reduces the ability parameters of each player character on the user team from the original value based on the comparison result of the team spirit value between the user team and the opponent team. Specifically, when the user team has a lower team spirit value than that of the opponent team, the changer 131 reduces the ability parameters of each player character on the user team from its original value. When the opponent team has a lower team spirit value than that of the user team, the changer 131 reduces the ability parameters of each player character on the opponent team from its original value. In this case, the team spirit value of the user team is an example of the "value acquired based on the second parameter of the object to be used", and the team spirit value of the opponent team is an example of the "value to be compared" or the "value acquired based on the second parameter of the object to be used by the opponent".

In the action part, the changer 131 reduces the ability parameters of the player character of the user from the original value based on the comparison result of the spirit parameter between the user player character (in FIG. 7 and FIG. 8, the batter character) and the opponent player character (in FIG. 7 and FIG. 8, the pitcher character). Specifically, when the user player character has a lower spirit parameter than that of the opponent player character, the changer 131 reduces the ability parameters of the user player character from its original value. When the opponent player character has a lower spirit parameter than that of the user player character, the changer 131 reduces the ability parameters of the opponent player character from its original value. In this case, the value of the spirit parameter of the user player character is an example of the "value acquired based on the second parameter of the object to be used", and the value of the spirit parameter of the opponent player character is an example of the "value to be compared" or the "value acquired based on the second parameter of the object to be used by the opponent".

[1-3-2-5] The second parameter of each object is set such that an object provided during a period other than the specific period is more easily changed by the changer 131 in a manner advantageous to the user compared with an object provided during the specific period.

The statement "the second parameter of each object is set such that an object provided during a period other than the specific period is more easily changed by the changer 131 in a manner advantageous to the user compared with an object provided during the specific period" means, for example, that the second parameter of each object is set as in the following example (1) or (2).

(1) For example, the second parameter of each object is set such that an object provided during a period other than the specific period is more easily changed by the changer 131 in a manner advantageous to the user than an object created during the specific period.

(1A) For example, in a game in which (a) a larger first parameter value is advantageous for the user, (b) as the second parameter of the object to be used becomes higher, the value acquired based on the second parameter of the object to be used becomes larger, and (c) the first parameter of the object to be used at the time of executing the game is reduced from the value set in advance when the above-mentioned acquired value is smaller than the value to be compared, the second parameter of each object is set such that an object provided during a period other than the specific period has a higher second parameter than that of an object provided during the specific period.

The statement "the second parameter of each object is set such that an object provided during a period other than the specific period has a higher second parameter than that of an object provided during the specific period" means that the second parameter of each object is set such that the maximum value (or minimum value) of the second parameter set for each object provided during a period other than the specific period is larger than the maximum value (minimum value) of the second parameter set for each object provided during the specific period. The second parameter of each object may also be set such that a statistical value (for example, an average value) of the second parameter set for each object provided during a period other than the specific period is larger than the statistical value (for example, an average value) of the second parameter set for each object provided during the specific period.

(1B) In a game in which (a) a larger first parameter value is advantageous for the user, (b) as the second parameter of the object to be used becomes lower, the value acquired based on the second parameter of the object to be used becomes smaller, and (c) the first parameter of the object to be used at the time of executing the game is reduced from the value set in advance when the above-mentioned acquired value is larger than the value to be compared, the second parameter of each object is set such that an object provided during a period other than the specific period has a lower second parameter than that of an object provided during the specific period.

The statement "the second parameter of each object is set such that an object provided during a period other than the specific period has a lower second parameter than that of an object provided during the specific period" means that the second parameter of each object is set such that the maximum value (or minimum value) of the second parameter set for each object provided during a period other than the specific period is smaller than the maximum value (minimum value) of the second parameter set for each object provided during the specific period. The second parameter of each object may also be set such that a statistical value (for example, an average value) of the second parameter set for each object provided during a period other than the specific period is smaller than the statistical value (for example, an average value) of the second parameter set for each object provided during the specific period.

(2) For example, the second parameter of each object is set such that an object provided during a period other than the specific period is more easily changed by the changer 131 in a manner advantageous to the user than an object provided during the specific period.

A third parameter is further associated with each object, and the second parameter of objects having the same third parameter are set such that an object provided during a period other than the specific period is more easily changed by the changer 131 in a manner advantageous to the user compared with an object provided during the specific period.

The "third parameter" is a parameter different from the first parameter and the second parameter. The "third parameter" may be increased or decreased in accordance with the progress of the game, or may be increased or decreased in accordance with an operation by the user.

The "third parameter" is a parameter having a correlation with the second parameter. For example, the "third parameter" is a parameter having a positive correlation with the second parameter. That is, a relationship between the third parameter and the second parameter is such that as the third parameter of the player character becomes higher, the second parameter of the player character also becomes higher, and as the third parameter of the player character becomes lower, the second parameter of the player character also becomes lower. The "third parameter" may also be a parameter having a negative correlation (inverse correlation) with the second parameter. That is, the relationship between the third parameter and the second parameter may be such that as the third parameter of the player character becomes lower, the second parameter of the player character becomes higher, and as the third parameter of the player character becomes higher, the second parameter of the player character becomes lower.

In the case of the baseball game described above, the spirit parameter of the player character is set such that the player characters from the latest series have a higher spirit parameter than that of the player characters from old series. That is, the spirit parameter of player characters having the same rank, level, and special training level (examples of the third parameter) is set such that the player characters from the latest series have a higher spirit parameter than that of the player characters from an old series. In this case, the period before the time T2, which is the time when the player character group of the latest series is released, corresponds to an example of the "specific period", and the period after the time T2 when the player character group of the latest series was released corresponds to an example of the "period other than the specific period".

[1-4. Processing] Next, processing to be executed in the game system 1 is described.

Figure 15:
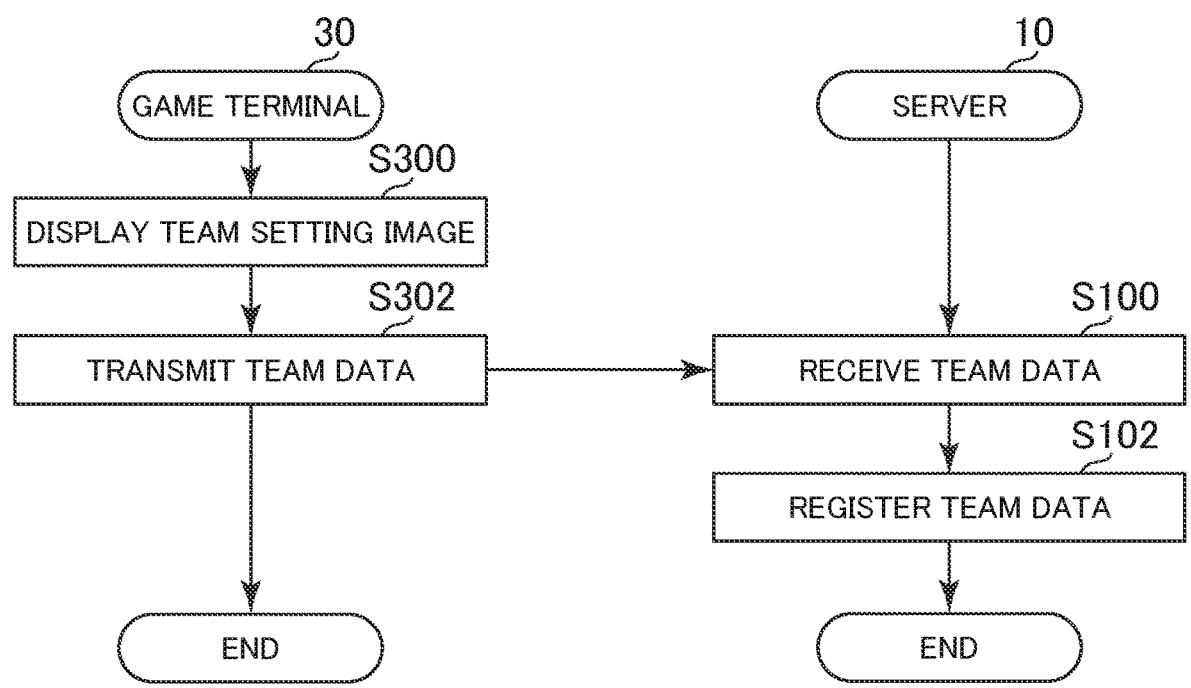
FIG. 15 is a flowchart for illustrating an example of processing to be executed in the game system.

[1-4-1] FIG. 15 is a flowchart for illustrating an example of processing to be executed when the user sets his or her team. The object selection receiver 110 is implemented by executing the processing illustrated in FIG. 15 in accordance with a program.

As illustrated in FIG. 15, first, the controller 31 of the game terminal 30 displays the team setting image G200 on the display 35 (Step S300). Although not shown in FIG. 15, the controller 31 acquires the possessed player character data D103 and the team data D104 of the user, and displays the team setting image G200 on the display 35 based on the acquired data.

For example, when the part P201 is selected, a part P205 corresponding to each player character registered as a fielder member is displayed in the area A204 based on the possessed player character data D103 and the member data D1041. For example, when the part P202 is selected, a part P205 corresponding to each player character registered as a pitcher member is displayed in the area A204 based on the possessed player character data D103 and the member data D1041. Further, for example, when the part P203 is selected, a part P205 corresponding to each player character not registered as a pitcher member or as a fielder member is displayed in the area A204 based on the possessed player character data D103 and the member data D1041. The controller 31 moves or switches the parts P205 in accordance with an operation by the user while the team setting image G200 is displayed.

When the setting of the team is complete (i.e., when the part P209 has been selected by the user), the controller 31 transmits the team data D104 indicating details of the setting of the team of the user to the server 10 via the communicator 33 (Step S302), and the server 10 receives the team data D104 via the communicator 13 (Step S100). At this time, information allowing the user ID of the user to be identified is transmitted from the game terminal 30 to the server 10 along with the team data D104.

When the team data D104 is received by the server 10, the controller 11 of the server 10 registers the team data D104 in the database DB (or storage 12) in association with the user ID of the user (Step S102).

Figure 16:
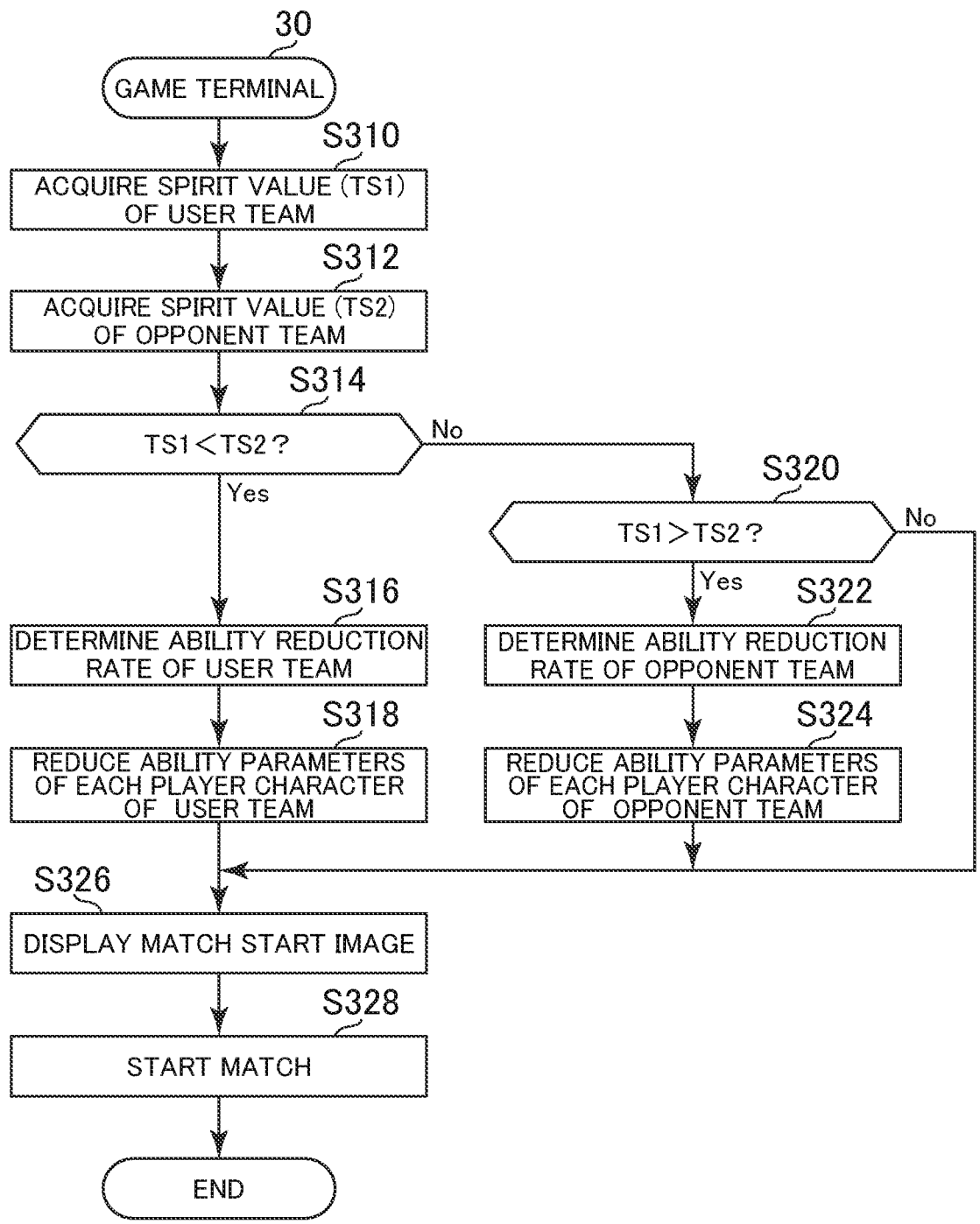
FIG. 16 is a flowchart for illustrating another example of processing to be executed in the game system.

[1-4-2] FIG. 16 is a flowchart for illustrating an example of processing to be executed when a match between the user team and the opponent team is started. The game executor 120 and the control executor 130 are implemented by executing the processing illustrated in FIG. 16 in accordance with a program.

As illustrated in FIG. 16, first, the controller 31 of the game terminal 30 acquires the team spirit value (TS1) of the user team (Step S310), and acquires the team spirit value (TS2) of the opponent team (Step S312).

Before the processing illustrated in FIG. 16 is executed, the data of the user team (team data D104 and possessed player character data D103 of the user) is provided from the server 10 to the game terminal 30, and the controller 31 acquires the team spirit value of the user team from the data.

Similarly, before the processing illustrated in FIG. 16 is executed, the data of the opponent team is also provided from the server 10 to the game terminal 30, and the controller 31 acquires the team spirit value of the opponent team from the data. When the opponent team is a team of another user, the data of the player characters set as the members of the team is acquired from among the possessed player character data D103 of the another user, and the data and the team data D104 of the another user are provided as the data of the opponent team. When the opponent team is a team created by the game developer, the team data created by the game developer is provided as data of the opponent team.

After Step S310 and Step S312 are executed, the controller 31 determines whether or not the team spirit value (TS1) of the user team is lower than the team spirit value (TS2) of the opponent team (Step S314). When the team spirit value (TS1) of the user team is lower than the team spirit value (TS2) of the opponent team, the controller 31 determines the ability reduction rate of the user team (Step S316). For example, when TS1 and TS2 are represented by "TPL" and "TPH", respectively, the controller 31 calculates the ability reduction rate of the user team based on the expression (1) described above.

Next, the controller 31 reduces the ability parameters of each player character of the user team based on the ability reduction rate determined in Step S316 (Step S318). That is, for each ability parameter of each player character of the user team, the controller 31 calculates a value obtained by multiplying the original value by the ability reduction rate determined in Step S316, and stores the calculated values in the storage 32 as the values of the ability parameters to be used in the match that is about to start.

Meanwhile, in Step S314, when it is not determined that the team spirit value (TS1) of the user team is lower than the team spirit value (TS2) of the opponent team, the controller 31 determines whether or not the team spirit value (TS1) of the user team is higher than the team spirit value (TS2) of the opponent team (Step S320). When the team spirit value (TS1) of the user team is higher than the team spirit value (TS2) of the opponent team, the controller 31 determines the ability reduction rate of the opponent team (Step S322). For example, when that TS2 and TS1 are represented by "TPL" and "TPH", respectively, the controller 31 calculates the ability reduction rate of the opponent team based on the expression (1) described above.

Next, the controller 31 reduces the ability parameters of each player character of the opponent team based on the ability reduction rate determined in Step S322 (Step S324). That is, for each ability parameter of each player character of the opponent team, the controller 31 calculates a value obtained by multiplying the original value by the ability reduction rate determined in Step S322, and stores the calculated values in the storage 32 as the values of the ability parameters to be used in the match that is about to start.

In Step S314, a case in which it is not determined that the team spirit value (TS1) of the user team is higher than the team spirit value (TS2) of the opponent team means that those team spirit values (TS1 and TS2) are equal. In this case, the processing of Step S316 and Step S318 is not executed, and the processing of Step S322 and Step S324 is also not executed. That is, there is no reduction in the ability parameters of the player characters of the user team, and there is no reduction in the ability parameters of the player characters of the opponent team.

After the execution of Step S318 or Step S324, or when it is not determined in Step S320 that the team spirit value (TS1) of the user team is higher than the team spirit value (TS2) of the opponent team, the controller 31 displays the match start image G300 on the display 35 (Step S326). In this case, when Step S316 and Step S318 have been executed, the part P302 is displayed in association with the first portion P3011 of the part P301. Meanwhile, when Step S322 and Step S324 have been executed, the part P302 is displayed in association with the second portion P3012 of the part P301.

Then, the controller 31 starts the match (Step S328). For example, the controller 31 displays the automatic progress part image G400 on the display 35, and causes the match to automatically progress.

In the above description, there is described a case in which all of the processing illustrated in FIG. 16 is executed by the game terminal 30. However, all or a part of the processing may be executed by the server 10. For example, the processing of Step S300 to Step S324 may be executed by the server 10, the processing results of Step S318 and Step S324 may be transmitted to the game terminal 30, and the processing of Step S326 and the subsequent steps may be executed by the game terminal 30. As another example, the processing of Step S300 to Step S316, Step S320, and Step S322 may be executed by the server 10, the processing results of Step S316 and Step S322 may be transmitted to the game terminal 30, and the processing of Step S318, Step S324, Step S326, and Step S328 may be executed by the game terminal 30.

Figure 17:
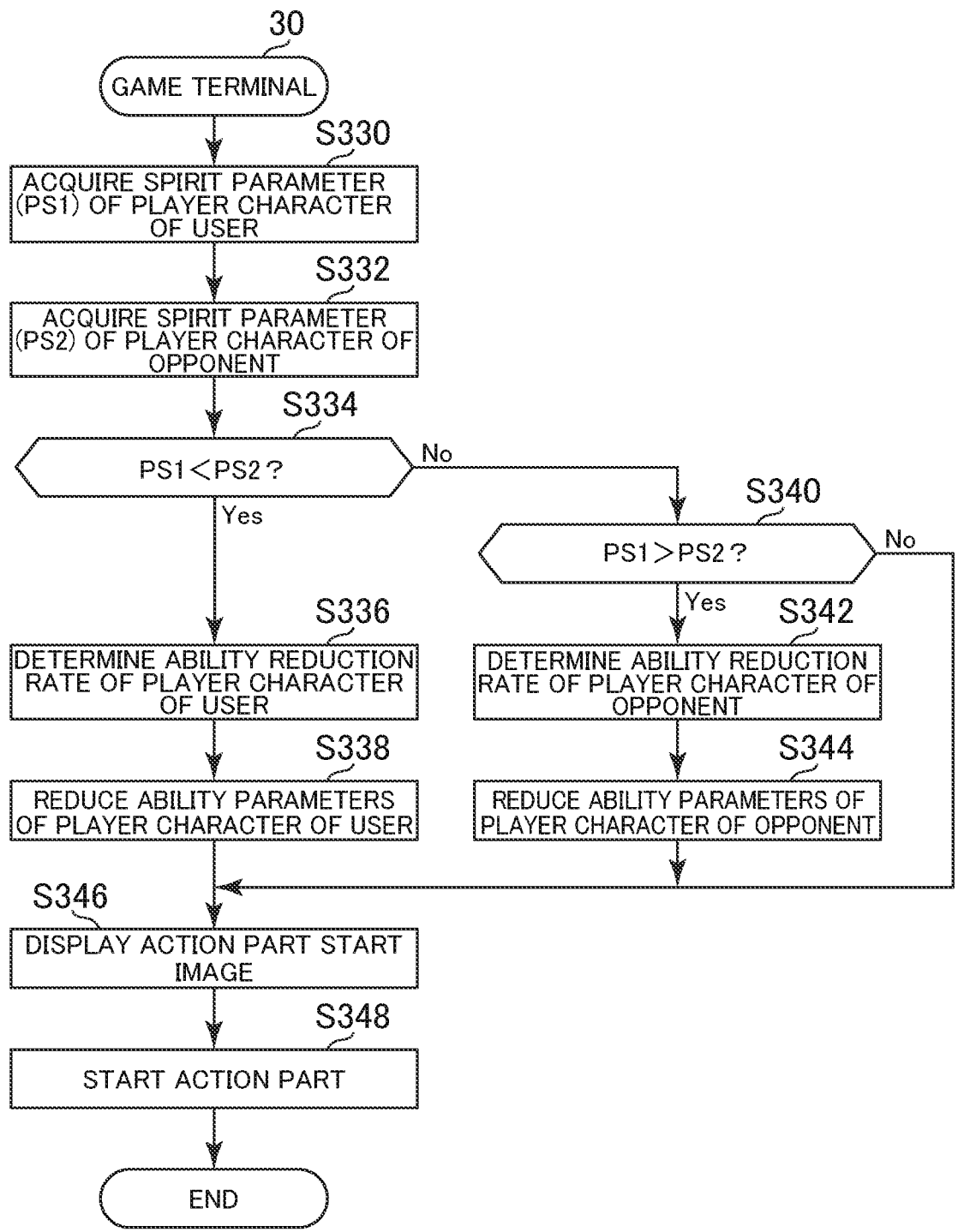
FIG. 17 is a flowchart for illustrating another example of processing to be executed in the game system.

[1-4-3] FIG. 17 is a flowchart for illustrating an example of processing to be executed when the action part is started. The automatic progress part switches to the action part when the match reaches a predetermined situation. Therefore, the processing illustrated in FIG. 17 is executed when the match reaches the predetermined situation. The game executor 120 and the control executor 130 are implemented by executing the processing illustrated in FIG. 17 in accordance with a program.

As illustrated in FIG. 17, first, the controller 31 of the game terminal 30 acquires the value (PS1) of the spirit parameter of the player character (the batter character in the examples illustrated in FIG. 7 and FIG. 8) of the user (Step S330), and the value (PS2) of the spirit parameter of the player character (the pitcher character in the examples illustrated in FIG. 7 and FIG. 8) of the opponent (Step S332).

After Step S330 and Step S332 are executed, the controller 31 determines whether or not the spirit parameter (PS1) of the player character of the user is lower than the spirit parameter (PS2) of the player character of the opponent (Step S334). When the spirit parameter (PS1) of the player character of the user is lower than the spirit parameter (PS2) of the player character of the opponent, the controller 31 determines the ability reduction rate of the player character of the user for this action part (Step S336). For example, when PS1 and PS2 are represented by "PSL" and "PSH", respectively, the controller 31 calculates the ability reduction rate of the player character of the user based on the expression (2) or (3) described above.

Next, the controller 31 reduces the ability parameters of the player character of the user based on the ability reduction rate determined in Step S336 (Step S338). That is, for each ability parameter of the player character of the user, the controller 31 calculates a value obtained by multiplying the original value by the ability reduction rate determined in Step S336, and stores the calculated values in the storage 32 as the values of the ability parameters to be used in the action part that is about to start.

Meanwhile, in Step S334, when it is not determined that the spirit parameter (PS1) of the player character of the user is lower than the spirit parameter (PS2) of the player character of the opponent, the controller 31 determines whether or not the spirit parameter (PS1) of the player character of the user is higher than the spirit parameter (PS2) of the player character of the opponent (Step S340). When the spirit parameter (PS1) of the player character of the user is higher than the spirit parameter (PS2) of the player character of the opponent, the controller 31 determines the ability reduction rate of the player character of the opponent (Step S342). For example, when PS2 and PS1 are represented by "PSL" and "PSH", respectively, the controller 31 calculates the ability reduction rate of the player character of the opponent based on the expression (2) or (3) described above.

Next, the controller 31 reduces the ability parameters of the player character of the opponent based on the ability reduction rate determined in Step S342 (Step S344). That is, for each ability parameter of the player character of the opponent, the controller 31 calculates a value obtained by multiplying the original value by the ability reduction rate determined in Step S342, and stores the calculated values in the storage 32 as the values of the ability parameters to be used in the action part that is about to start.

In Step S334, a case in which it is not determined that the spirit parameter (PS1) of the player character of a user U1 is higher than the spirit parameter (PS2) of the player character of the opponent means that those spirit parameters (PS1 and PS2) are equal. In this case, the processing of Step S336 and Step S338 is not executed, and the processing of Step S342 and Step S344 is also not executed. That is, there is no reduction in the ability parameters of the player character of the user, and there is no reduction in the ability parameters of the player character of the opponent.

After the execution of Step S338 or Step S334, or when it is not determined in Step S340 that the spirit parameter (PS1) of the player character of the user is higher than the spirit parameter (PS2) of the player character of the opponent, the controller 31 displays the action part start image G500 on the display 35 (Step S346). In this case, when Step S336 and Step S338 have been executed, the part P507 is displayed in association with the first portion P5061 of the part P506. Meanwhile, when Step S342 and Step S344 have been executed, the part P507 is displayed in association with the second portion P5062 of the part P506.

Then, the controller 31 starts the action part (Step S348).

For example, the controller 31 displays the action part image G600 on the display 35, and performs the action part.

In the above description, there is described a case in which all of the processing illustrated in FIG. 17 is executed by the game terminal 30. However, all or a part of the processing may be executed by the server 10. For example, the processing of Step S330 to Step S344 may be executed by the server 10, the processing results of Step S338 and Step S344 may be transmitted to the game terminal 30, and the processing of Step S346 and the subsequent steps may be executed by the game terminal 30. As another example, the processing of Step S330 to Step S336, Step S340, and Step S342 may be executed by the server 10, the processing results of Step S336 and Step S342 may be transmitted to the game terminal 30, and the processing of Step S338, Step S344, Step S346, and Step S348 may be executed by the game terminal 30.

[1-5. Conclusion] In the game system 1 according to the embodiment described above, the user can be urged to acquire and use a player character from the latest series rather than from an old series by executing control (Step S310 to Step S324 of FIG. 16, and Step S330 to Step S344 of FIG. 17) in the game such that the game is more advantageous to a user when a player character provided from an old series is not included among the members of the user team compared with when a player character provided from an old series is included among the members of the user team.

Specifically, a spirit parameter is set for the player characters separately from the ability parameters, and the ability parameters of each player character of the user team are reduced based on a comparison result between the team spirit value of the user team acquired based on the spirit parameter of the player characters of the user team and the team spirit value of the opponent team acquired based on the spirit parameter of the player characters of the opponent team. In addition, the spirit parameter is set higher for player characters from the latest series than for player characters from an old series (FIG. 9), and therefore it is possible to urge the user to acquire and use player characters from the latest series rather than from an old series. For example, the user can be urged to acquire and use, among the player characters having the same rank, level, and special training level, a player character from the latest series rather than a player character from an old series. As a result, through use of the spirit parameter, the user can be urged to acquire and use a player character from the latest series rather than a player character from an old series even without changing an ability parameter. As a result, without harming reality of the game, it is possible to urge the user to acquire and use a player character from the latest series rather than a player character from an old series.

In the game system 1 of the embodiment, the ability parameters of the player characters are reduced. However, the reduction of the ability parameters is temporary and internal. The values of the reduced ability parameters are not displayed in the player information image G100, and the ability parameters corresponding to the actual performance of the real player are displayed in the player information image G100. Therefore, ability parameters deviating from the abilities of the real player are not displayed in the player information image G100, and hence reality of the game is not harmed.

In the description given above, the spirit parameter is used to urge the user to acquire and use player characters from the latest series rather than player characters from an old series.

However, the configuration itself relating to the spirit parameter also has an effect of improving the interest in the game. That is, interest in a competitive game can be improved by employing a configuration in which the ability parameters of the player character of at least one of the user team and the opponent team are reduced based on a difference value between the spirit parameter of the user team and the spirit parameter of the opponent team, or a configuration (action part) in which the ability parameters of at least one of the user player character and the opponent player character are reduced based on a difference value between the spirit parameter of the user player character and the spirit parameter of the opponent player character.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A game system comprising:
at least one processor; and
at least one memory device that stores a plurality of instructions, which when executed by the at least one processor, cause the at least one processor to:
acquire a first parameter corresponding to a user object, the first parameter indicating an ability of the user object;
acquire a second parameter corresponding to the user object, the second parameter being different from the first parameter;
acquire a third parameter corresponding to an opponent object, the third parameter indicating an ability of the opponent object;
acquire a fourth parameter corresponding to the user object, the fourth parameter being different from the first parameter;
compare the second parameter and the fourth parameter; and
execute a control for having an advantage on a game in which the user object competes with the opponent object based on the first parameter, the third parameter and a comparison result,
wherein the game system includes an automatic progress part in which a match automatically progresses and an action part in which a user performs an operation, and
the instructions further cause the at least one processor to execute the control in the action part;
wherein the automatic progress part is executed based on user objects and opponent objects, and
the instructions further cause the at least one processor to:
compare second parameter and the fourth parameter, and
execute the control based on the first parameter, the third parameter and the comparison result.

2. The game system according to claim 1, wherein the instructions further cause the at least one processor to execute, as the control, processing that changes at least one of the first parameter and the third parameter based on the comparison result.

3. The game system according to claim 1, wherein:
the automatic progress part is executed based on the user objects and the opponent objects,
the game switches the automatic progress part to the action part, when the automatic progress part becomes a predetermined situation and
the instructions further cause the at least one processor to:
select a combination of the user object and the opponent from among the user objects and the opponent objects, when the game switches to the action part;
compare the second parameter corresponding to the user object included in the combination and the fourth parameter corresponding to the opponent object included in the combination; and execute the control based on the user object included in the combination and the fourth parameter corresponding to the opponent object included in the combination.

4. The game system according to claim 1, wherein the instructions further cause the at least one processor to execute the control based on a difference between the second parameter and the fourth parameter.

5. A game control device comprising:
at least one processor; and
at least one memory device that stores a plurality of instructions, which when executed by the at least one processor, cause the at least one processor to:
acquire a first parameter corresponding to a user object, the first parameter indicating an ability of the user object;
acquire a second parameter corresponding to the user object, the second parameter being different from the first parameter;
acquire a third parameter corresponding to an opponent object, the third parameter indicating an ability of the opponent object;
acquire a fourth parameter corresponding to the user object, the fourth parameter being different from the first parameter;
compare the second parameter and the fourth parameter; and
execute a control for having an advantage on a game in which the user object competes with the opponent object based on the first parameter, the third parameter and a comparison result,
wherein the game includes an automatic progress part in which a match automatically progresses and an action part in which a user performs an operation, and
the instructions further cause the at least one processor to execute the control in the action part;
wherein the automatic progress part is executed based on user objects and opponent objects, and
the instructions further cause the at least one processor to:
compare second parameter and the fourth parameter, and
execute the control based on the first parameter, the third parameter and the comparison result.

6. A non-transitory information storage medium having stored thereon a program for causing a computer to:
acquire a first parameter corresponding to a user object, the first parameter indicating an ability of the user object;
acquire a second parameter corresponding to the user object, the second parameter being different from the first parameter;
acquire a third parameter corresponding to an opponent object, the third parameter indicating an ability of the opponent object;
acquire a fourth parameter corresponding to the user object, the fourth parameter being different from the first parameter;
compare the second parameter and the fourth parameter; and
execute a control for having an advantage on a game in which the user object competes with the opponent object based on the first parameter, the third parameter and a comparison result,
wherein the game includes an automatic progress part in which a match automatically progresses and an action part in which a user performs an operation,
wherein the automatic progression of the match is executed based on user objects and opponent objects, and
the program further causes the computer to:
execute the control in the action part,
compare the second parameter and the fourth parameter, and
execute the control based on the first parameter, the third parameter and the comparison result.

* * * * *